United States Patent
Kawasaki

(10) Patent No.: US 8,421,525 B2
(45) Date of Patent: Apr. 16, 2013

(54) SEMICONDUCTOR CIRCUIT DEVICE

(75) Inventor: Kenichi Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 160 days.

(21) Appl. No.: 13/046,344

(22) Filed: Mar. 11, 2011

(65) Prior Publication Data

US 2011/0227634 A1    Sep. 22, 2011

(30) Foreign Application Priority Data

Mar. 17, 2010    (JP) ................................ 2010-061520

(51) Int. Cl.
*G05F 1/10* (2006.01)

(52) U.S. Cl.
USPC ........................................ 327/540; 327/544

(58) Field of Classification Search .................. 327/534, 327/535, 537, 540, 543, 544
See application file for complete search history.

(56) References Cited

U.S. PATENT DOCUMENTS

| | | | |
|---|---|---|---|
| 4,952,863 A | | 8/1990 | Sartwell et al. |
| 5,614,847 A | * | 3/1997 | Kawahara et al. ............. 326/98 |
| 7,436,206 B2 | * | 10/2008 | Kurotsu ........................... 326/34 |
| 7,839,205 B2 | * | 11/2010 | Hirobe ............................ 327/540 |
| 7,868,685 B2 | * | 1/2011 | Kitaura ........................... 327/538 |

OTHER PUBLICATIONS

H. Mair et al., "A 65-nm Mobile Multimedia Application Processor with an Adaptive Power Management Scheme to Compensate for Variations", VLSI Circuits Digest of Technical Papers, pp. 224-225, Jun. 2007.

* cited by examiner

*Primary Examiner* — Jeffrey Zweizig
(74) *Attorney, Agent, or Firm* — Arent Fox LLP

(57) ABSTRACT

The semiconductor circuit device includes a power line receiving first voltage; each of internal circuits being provided with different operating voltages by the operation mode; a power supply circuit connected with one of internal circuits and the power line to provide second voltage lower than the first voltage to the one of internal circuits; and a control circuit controlling the power supply circuit in accordance with each of the operation modes, wherein when a change of a operation mode is performed, if a operating voltage after the change of a operation mode is higher than a operating voltage before the change of a operation mode, firstly the control circuit controls the power supply circuit to supply a second voltage higher than the operating voltage and secondly the control circuit controls the power supply circuit to supply the operation voltage after the change of a operation mode to the internal circuit.

8 Claims, 12 Drawing Sheets

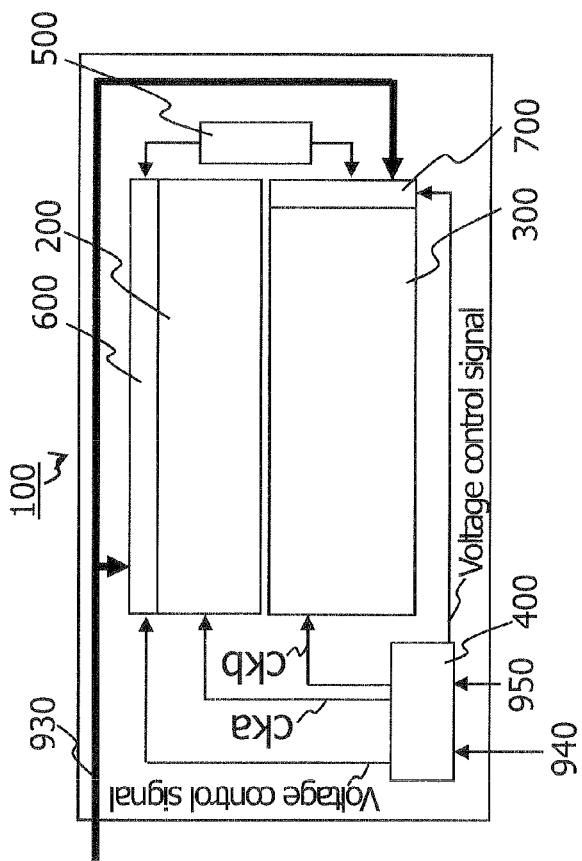

FIG. 5A
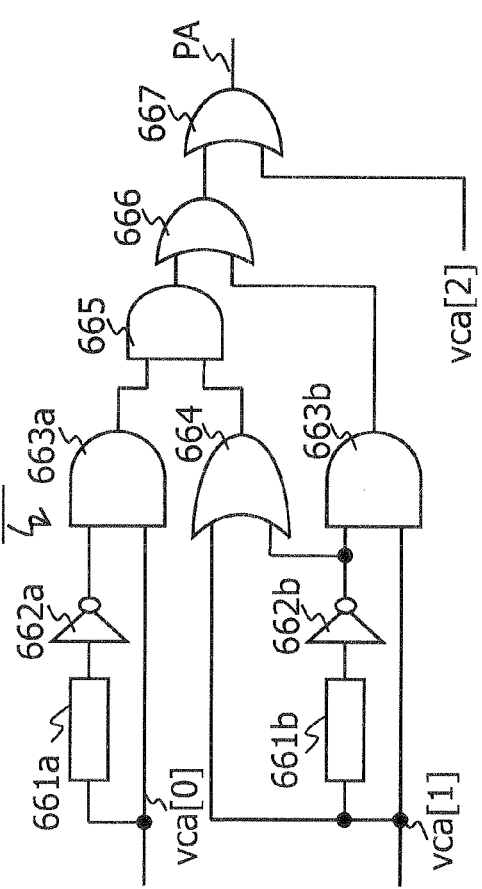
FIG. 5B
| DVFS Mode | CLK Frequency/ Supply voltage | vca[2:0] |
|---|---|---|
| 4 | 400MHz/1.2V | 1XX |
| 3 | 200MHz/1.1V | 011 |
| 2 | 100MHz/1.0v | 010 |
| 1 | 50MHz/0.9V | 001 |
| 0 | 25MHz/0.8V | 000 |
FIG. 5C
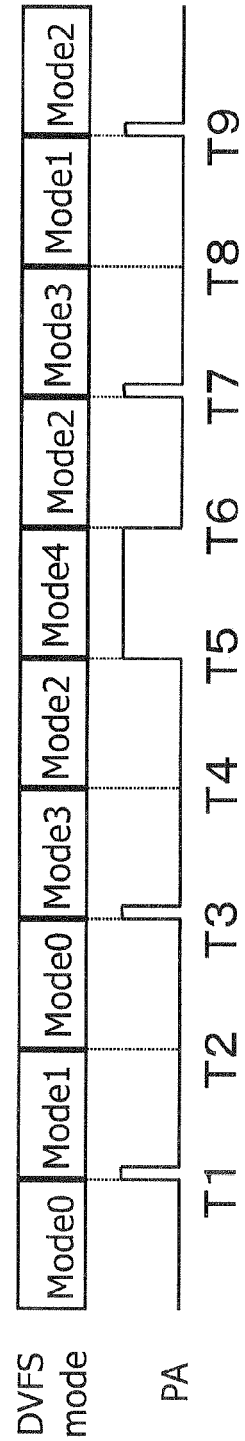

| vca[1:0] | sw0 | sw1 | sw2 | sw3 | ※Vddma |
|---|---|---|---|---|---|
| 11 | off | off | off | on | 1.1V |
| 10 | off | off | on | off | 1.0V |
| 01 | off | on | off | off | 0.9V |
| 00 | on | off | off | off | 0.8V |

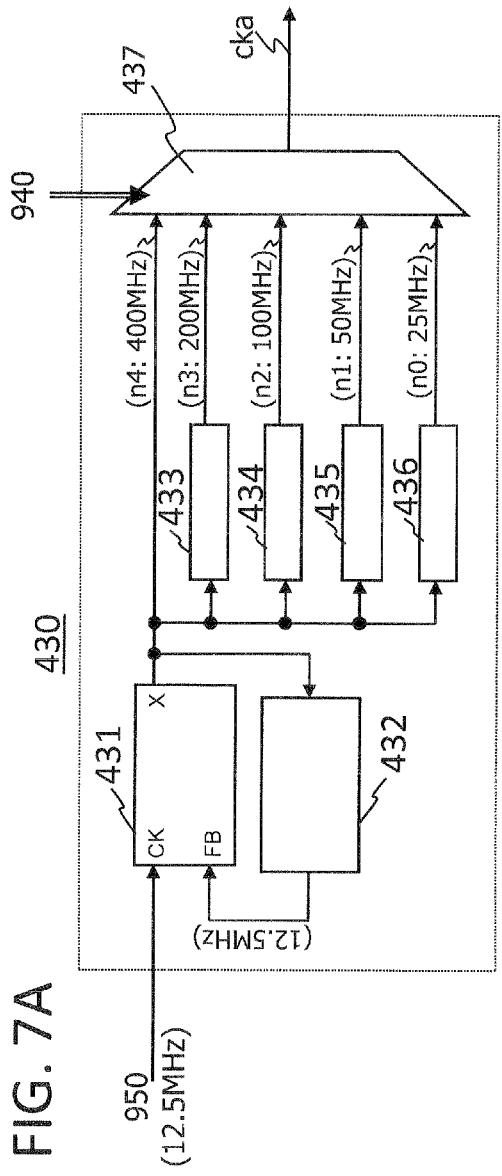

SEMICONDUCTOR CIRCUIT DEVICE

CROSS REFERENCE TO RELATED APPLICATION

This application is based upon and claims the benefit of priority from the prior Japanese Patent Application NO. 2010-061520 filed on Mar. 17, 2010, the entire contents of which are incorporated herein by reference.

FIELD

The embodiments discussed herein are related to a semiconductor circuit device containing internal circuits and a power supply circuit supplying power to the internal circuits.

BACKGROUND

A technique for saving power consumption in a semiconductor circuit device has been developed in which the semiconductor circuit device includes an on-chip power supply circuit that reduces a voltage supplied from a power source external to the semiconductor circuit device and provides the reduced voltage to circuit blocks that operate functionally together (hereinafter the circuit blocks will be referred to as internal circuits) (H. Mair et. al., "A 65 nm Mobile Multimedia Applications Processor with Adaptive Power Management Scheme to Compensate for Variations," VLSI Circuits Dig. Tech. Paper 21.5, June, 2007). By reducing the voltage to be supplied to the internal circuits from the voltage level of the external power source, power adjusted in accordance with power consumption in each individual internal circuit is supplied to the internal circuit and thereby excessive power supply is avoided. Consequently, the power consumption in the semiconductor circuit device may be reduced.

Stable voltage supply is a significant issue for power supply circuits that supplies a voltage reduced from the voltage of an external power source as described above. To solve the issue, a technique that minimizes a supply voltage drop caused by a sharp increase in power consumption in the internal circuits is being developed (refer to U.S. Pat. No. 4,952,863).

U.S. Pat. No. 4,952,863 proposes a technique in which a signal input in internal circuits is also input in a monostable multivibrator, which generates a pulse used to rapidly increase the current supply capability of power supply transistors in a power supply circuit when the voltage of the input signal reaches a certain threshold. Thus, when current consumption in the internal circuits rapidly increases, the power supply circuit may supply an amount of current commensurate with the current consumption in the internal circuits in accordance with the signal input in the internal circuits. Consequently, a drop in the reduced voltage supplied to the internal circuits is avoided.

Another technique has come into use in which a power supply circuits supply reduced voltage that varies depending on operation modes of internal circuits to the internal circuits, instead of continuously supplying a constant reduced voltage, in order to further reduce power consumption.

An issue to be solved in use of the technique is to shorten the period of time during which a reduced voltage is unstable after changing a reduced voltage. This is because the internal circuits may not be available until the reduced voltage becomes stable, which determines a delay in operation of the entire semiconductor circuit device including the internal circuits.

SUMMARY

According to one aspect of the embodiments, the following semiconductor circuit device is provided. The semiconductor circuit device includes a power line receiving a first voltage from an external power source; a set of internal circuits, each of the internal circuit having a plurality of operation modes, each of the internal circuit being provided with different operating voltages in accordance with each of the operation mode; a power supply circuit electrically connected with one of the set of internal circuits and the power line to provide a second voltage lower than or equal to the first voltage of the power line to the one of the set of internal circuits; and a control circuit controlling the power supply circuit in accordance with each of the plurality of operation modes. When in the one of the set of internal circuits, a change of a operation mode is performed from one operation mode to another, if a operating voltage for a operation mode after the change of a operation mode is higher than a operating voltage for a operation mode before the change of a operation mode, firstly the control circuit controls/or/encourages the power supply circuit to supply a second voltage higher than the operating voltage for the operation mode after the change of a operation mode to the one of the set of internal circuits and secondly the control circuit controls/or/encourages the power supply circuit to supply the operation voltage for the operation mode after the change of a operation mode to the one of the set of internal circuits.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF THE DRAWINGS

FIGS. 1A and 1B are diagrams illustrating a semiconductor circuit device 100;

FIGS. 5A, 5B and 5C are diagrams illustrating an operation of a pulse generator 660 generating a signal PA in response to a signal vca;

FIGS. 7A and 7B illustrate an example of a system clock generator A 430 included in a PMU 400;

DESCRIPTION OF EMBODIMENTS

The present invention encompasses, in addition to the exemplary embodiments described herein, design modifications to the exemplary embodiments which may occur to those skilled in the art and combinations of any components that appear in the exemplary embodiments. The present invention also encompasses implementations in which a component is replaced with another component that has the same effects and is not limited to the exemplary embodiments described herein.

First Embodiment

Figure 1C:
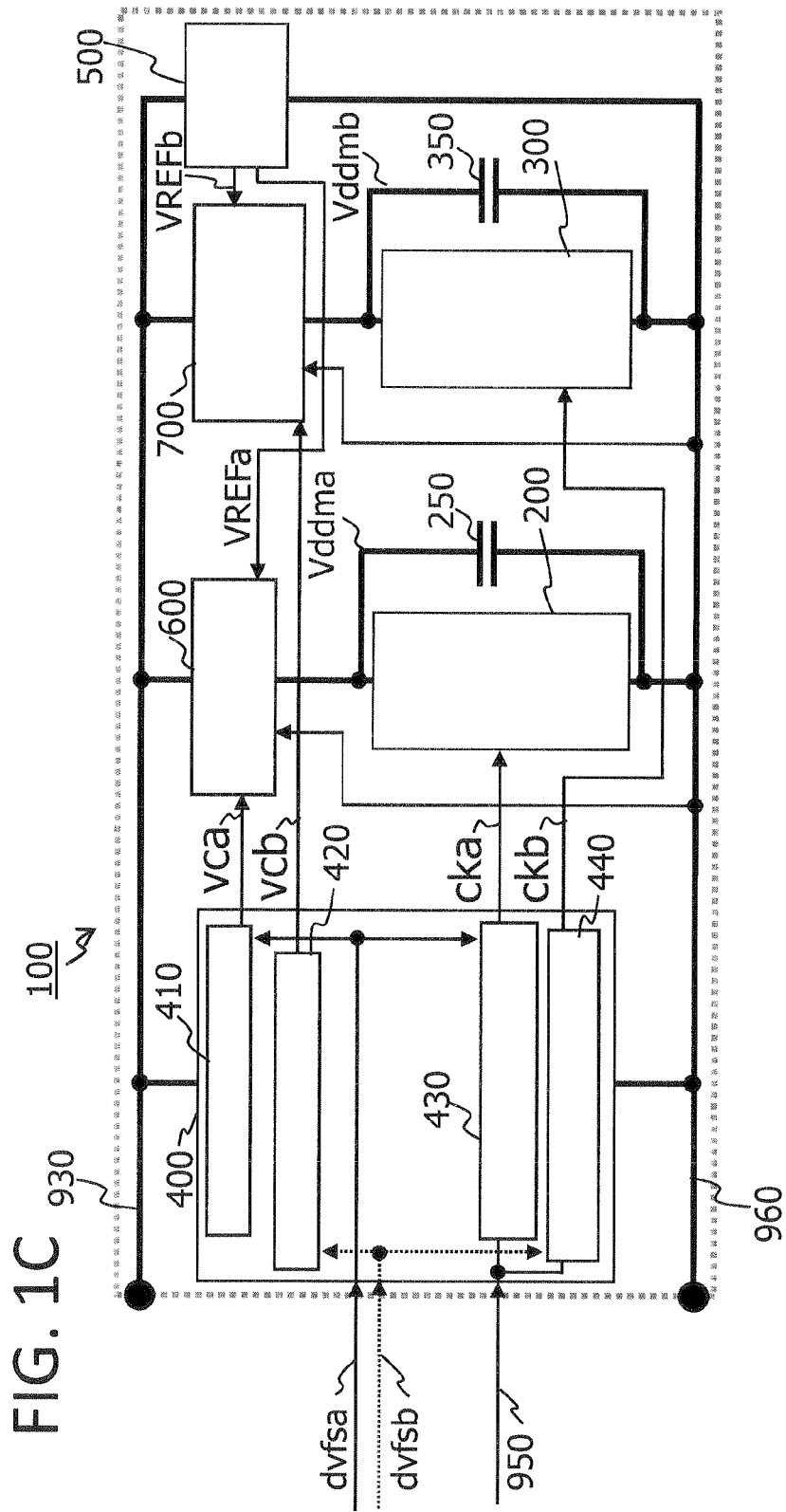
FIG. 1C is a diagram illustrating the semiconductor circuit device 100.

FIGS. 1A, 1B and 1C illustrate a semiconductor circuit device 100. The semiconductor circuit device 100 includes internal circuits (circuit A 200 and circuit B 300), a power managing unit (PMU) 400, a VREF generator 500 and regulators 600 and 700.

FIG. 1A is a circuit block diagram of the semiconductor circuit device 100. The internal circuits A200 and B300 are circuit blocks, each including a set of circuits that operate functionally together, embedded in the semiconductor circuit device 100.

The regulator 600 receives a power supply voltage of 1.2 V through a power line VDD 930, stabilizes and reduces the power supply voltage to a level used in an operation mode of the internal circuit A 200, and supplies the stabilized reduced voltage to the internal circuit A 200. Here, the reduced voltage is a voltage lower than or equal to a power supply voltage applied to the power line VDD 930 from a power source external to the semiconductor circuit device 100.

The regulator 700, which is similar to the regulator 600, receives a power supply voltage of 1.2 V through the power line VDD 930 and supplies a reduced voltage to the internal circuit B 300.

The PMU 400 receives a DVFS mode signal 940, which will be described later, and a system clock 950, distributes an internal clock to the internal circuits A200 and B300, and supplies a voltage control signal that determines the level of the reduced voltage to be supplied to the regulators 600 and 700 to the regulators 600 and 700.

The VREF generator 500 generates a constant reference voltage, for example 0.6 V.

FIG. 1B is a table for explaining DVFS (Dynamic Voltage and Frequency Scaling) modes. The DVFS mode is a load mode of the internal circuits A 200 and B 300. The load mode is set according to a clock frequency and a supply voltage applied to each internal circuit. In the example illustrated in FIG. 1B, DVFS modes 0 to 4 are defined. In mode 0, the internal circuit operates with a clock frequency of 25 MHz and a supply voltage of 0.8 V; in mode 1, the internal circuit operates with a clock frequency of 50 MHz and a supply voltage of 0.9 V; in mode 2, the internal circuit operates with a clock frequency of 100 MHz and a supply voltage of 1.0 V; in mode 3, the internal circuit operates with a clock frequency of 200 MHz and a supply voltage of 1.1 V; and in mode 4, the internal circuit operates with a clock frequency of 400 MHz and a supply voltage of 1.2 V. The internal circuits A 200 and B 300 request a higher supply voltage when the internal circuits A 200 and B 300 operate in a DVFS mode that uses an internal clock signal with a higher clock frequency.

FIG. 1C is a circuit diagram of the semiconductor circuit device 100.

The PMU 400 includes a voltage controller A 410 for the internal circuit A 200 and a voltage controller B 420 for the internal circuit B 300. The PMU 400 also includes a clock generator A 430 for the internal circuit A 200 and a clock generator B 440 for the internal circuit B 300.

The voltage controller A outputs a signal vca to the regulator 600 to control the regulator 600. The voltage controller B outputs a signal vcb to the regulator 700 to control the regulator 700. The signals vca and vcb may be analog signals or digital signals made up of a several bits.

The voltage controllers A and B receive signals dvfsa and dvfsb, respectively, that constitute a DVFS mode signal 940 and set the voltages of the control signals vca and vcb, respectively, to voltages (or digital logical values) that is dependent on the DVFS modes indicated by the DVFS mode signals A and B, respectively. Both of the voltage controllers A and B receive a voltage of 1.2 V through the power line VDD 930 and are connected to a ground line VSS 960 that supplies a ground potential.

The clock generator A 430 generates an internal clock cka from a system clock supplied from a source external to the semiconductor circuit device 100, that is, the system clock sclk 950, and outputs the internal clock cka to the internal circuit A 200. The clock generator B 440 generates an internal clock ckb from the system clock sclk 950 and outputs the internal clock ckb to the internal circuit B 300. The clock generators A 430 and B 440 are supplied with power through the power line VDD 930 and the ground line VSS 960. The clock generators A 430 and B 440 receive signals dvfsa and dvfsb, respectively, that constitute the DVFS mode signal 940 and change the frequencies of the internal clocks cka and ckb, respectively, according to a DVFS mode given in the table of FIG. 1B.

The VREF generator 500 supplies a reference voltage of 0.6 V to the regulators 600 and 700 through signals VREFa and VREFb, respectively.

The regulators 600 and 700 are connected to the power line VDD 930 and the ground line VSS 960, receive the control signal vca and the signal VREFa, and the signal vcb and the control signal VREFb, respectively, and supply reduced voltages Vddma and Vddmb, respectively, according to a DVFS mode to the internal circuits A 200 and B 300, respectively. The regulators 600 and 700 supply the reduced voltages Vddma and Vddmb to the stabilizing capacitances ca 250 and cb 350 as well.

The internal circuits A 200 and B 300 receive the internal clock signals cka and ckb, respectively, the reduced voltages Vddma and Vddmb, respectively, and the ground potential through the ground line VSS 960 and operate with these signals.

Figure 2A:
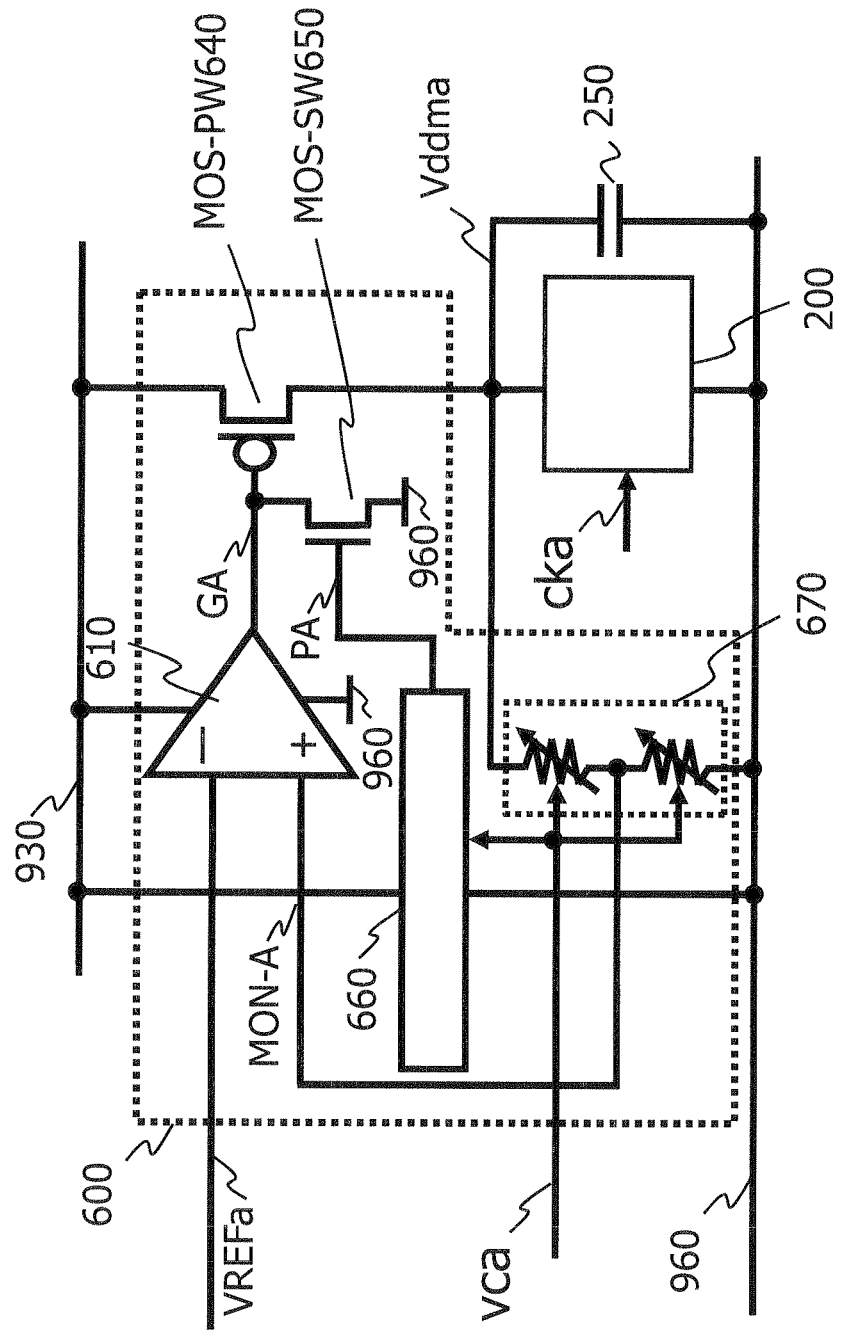
FIG. 2A is a diagram illustrating a regulator 600 in detail.
Figure 2B:
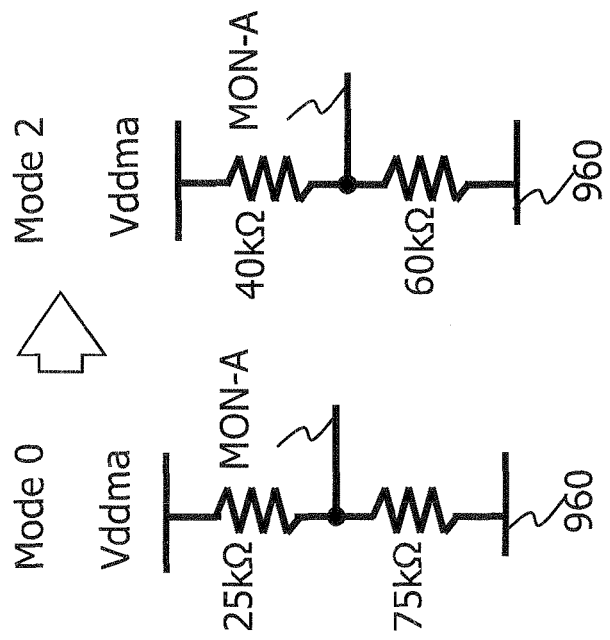
FIGS. 2B and 2C are diagrams illustrating details of the regulator 600.
Figure 2C:
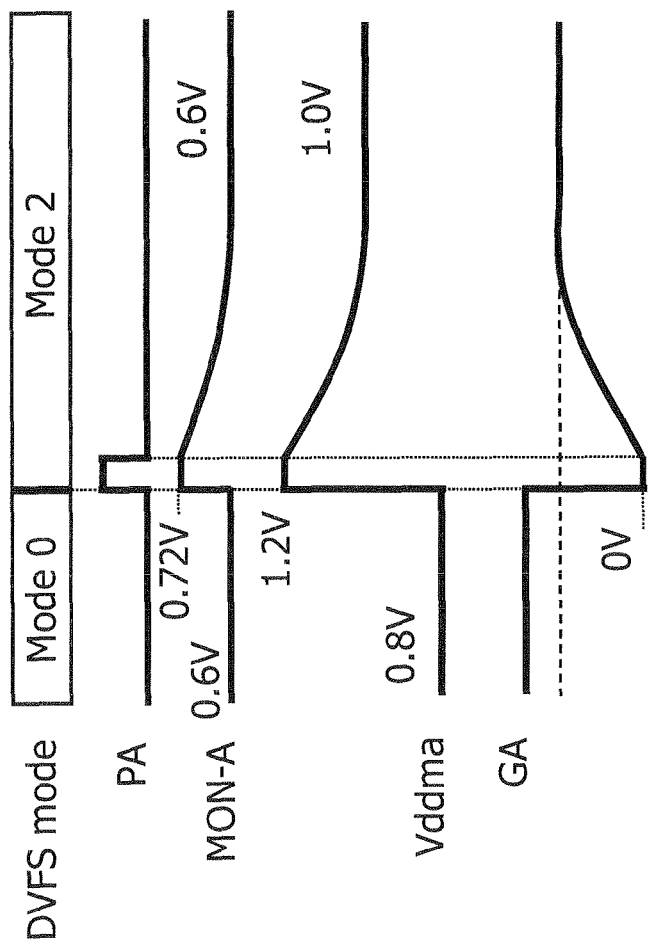

FIGS. 2A, 2B and 2C are diagrams illustrating the regulator 600 in detail. The regulator 700 has the same circuit configuration as the regulator 600 and operates in the same way as the regulator 600. FIG. 2A illustrates the regulator 600, the internal circuit A 200 and a stabilizing capacitance ca 250.

The regulator 600 includes a differential amplifier 610, a power MOS transistor MOS-PW 640, a switch MOS transistor MOS-SW 650, a pulse generator 660, and a dividing ratio variable voltage divider 670.

The differential amplifier 610 receives a signal MON-A from the dividing ratio variable voltage divider 670 and a signal VREFa that supplies a reference voltage of 0.6 V and amplifies the difference between the voltages of the two signals. When the switch MOS transistor MOS-SW 650 is off, the voltage amplified by the differential amplifier 610 is output to the power MOS transistor MOS-PW 640 through a signal GA.

To increase the reduced voltage Vddma according to a DVFS mode, the resistance value of a variable resistance 671 of the dividing ratio variable voltage divider 670 is increased and the resistance value of a variable resistance 672 is decreased, thereby reducing the difference between the values of the resistances to reduce the voltage of the signal MON-A.

When the switch MOS transistor MOS-SW 650 is on, the voltage amplified by the differential amplifier 610 is not transmitted to the power MOS transistor MOS-PW 640. This is, because when the switch MOS transistor MOS-SW 650 is on, the signal GA is at the ground potential.

Here, the differential amplifier 610 operates with a voltage of 1.2 V supplied through the power line VDD 930 and the ground voltage supplied through the ground line VSS 960.

The power MOS transistor MOS-PW 640 is a p-MOS transistor having a source connected to the power line VDD 930, a drain connected to a power line that supplies the reduced voltage Vddma to the internal circuit A 200, and a gate connected to the signal GA. The power MOS transistor MOS-PW 640 supplies a current that depends on the voltage of the signal GA to the internal circuit A 200 through the power line VDD 930. Since the differential amplifier 610 controls the signal GA so that the current driving capability of the power MOS transistor MOS-PW 640 is set according to current consumption in the internal circuit A 200, a predetermined reduced voltage Vddma may be supplied to the internal circuit A 200.

When the gate of the power MOS transistor MOS-PW 640 is forced to the ground potential, the driving capability of the power MOS transistor MOS-PW 640 significantly exceeds current consumption in the internal circuit A 200 and therefore a voltage approximately equal to the voltage of the power line VDD 930 is supplied to the internal circuit A 200 as the reduced voltage Vddma.

While the power MOS transistor MOS-PW 640 described above is a p-MOS transistor, the power MOS transistor MOS-PW 640 may be an n-MOS transistor. In that case, the gate voltage is controlled to a voltage opposite in polarity to the voltage in the control of the P-MOS transistor, of course. The gate voltage in the control of the n-MOS transistor needs to be equal to the voltage of the power line VDD 930 plus the threshold voltage of the n-MOS transistor, instead of forcing the gate voltage to the ground voltage level as in the control of the p-MOS transistor.

The switch MOS transistor MOS-SW 650 is an n-MOS transistor having a source connected to the signal GA, a drain connected to the ground line VSS 960, and a gate connected to a signal PA output from the pulse generator 660.

When the voltage of the signal PA is positive, the switch MOS transistor MOS-SW 650 is turned on to connect the signal GA to the ground line VSS 960. Consequently, the signal GA is forced to ground when the signal PA has a positive voltage.

The pulse generator 660 is a pulse circuit that outputs a signal (pulse signal) that has a positive voltage as the signal PA in a predetermined duration after a predetermined change in the voltage of the signal vca from the PMU 400 has occurred, if the signal vca is an analog signal.

On the other hand, if the signal vca is a digital signal made up of several bits, the pulse generator 660 outputs a pulse signal as the signal PA when the logical value of any of the bits has changed in response to change from a DVFS mode with a lower system clock frequency to another DVFS mode with a higher system clock frequency.

The pulse generator 660 operates with a voltage supplied through the power line VDD 930 and a voltage supplied through the ground line VSS 960.

The dividing ratio variable voltage divider 670 includes variable resistances 671 and 672 connected in series and outputs the signal MON-A from an intermediate node to which the variable resistances 671 and 672 are connected. The voltage of the signal MON-A is a intermediate voltage between the voltage of the power line VDD 930 applied to the terminal of the variable resistance 671 that is not connected to the intermediate node and the voltage of the ground line VSS 960 applied to the terminal of the variable resistance 672 that is not connected to the intermediate node.

The stabilizing capacitance ca 250 is a capacitance connected to the power line having a reduced voltage Vddma and the ground line VSS 960 in parallel with the internal circuit A 200. The parallel connection of the stabilizing capacitance ca 250 with the internal circuit A 200 may prevent a rapid decrease in the reduced voltage Vddma when power consumption in the internal circuit A 200 increases in a short period of time.

The internal circuit A 200 is the same as the internal circuit A 200 illustrated in FIG. 1 and therefore description of the internal circuit A 200 will be omitted.

FIG. 2B is a diagram for explaining an operation of the dividing ratio variable voltage divider 670. To increase the reduced voltage Vddma according to a DVFS mode, the resistance value of the variable resistance 671 in the dividing ratio variable voltage divider 670 is decreased and the resistance value of the variable resistance 672 is increased. To increase the reduced voltage Vddma according to a DVFS mode, the resistance value of the variable resistance 671 is increased and the resistance value of the variable resistance 672 is decreased.

For example, in the left-hand part of FIG. 2B, the resistance value of the variable resistance 671 is 25 kilo-ohms and the resistance value of the variable resistance 672 is 75 kilo-ohms in DVFS mode 0. In the right-hand part of FIG. 2B, the resistance value of the variable resistance 671 is 40 kilo-ohms and the resistance value of the variable resistance 672 is 60 kilo-ohms in DVFS mode 2.

FIG. 2C illustrates changes in voltage level of the signal from the regulator 600 and changes in the reduced voltage Vddma. The signal vca has a voltage that changes according to the DVFS mode of the internal circuit A 200. When switching from DVFS mode 0 to DVFS mode 2 occurs, the voltage of the signal vca increases in a step-like manner as illustrated in FIG. 2C. While the signal vca is an analog signal with a voltage that changes when DVFS mode changes in the example described above, the signal vca may be a digital signal made up of several bits. In that case, the resistance values of the variable resistances 671 and 672 are changed according to a numerical value represented by the signal vca. When the DVFS mode represented by the signal vca changes in the direction that increases the clock frequency, that is, in the direction that increases the reduced voltage Vddma, the pulse generator 660 outputs a pulse signal as the signal PA.

When the DVFS mode changes and the voltage of the signal vca changes in the direction that increases Vddma, the voltage of the signal PA, which is normally at the ground potential, becomes a positive level which has the shape of a pulse with a predetermined pulse width on the edge of the voltage change.

The voltage of the signal MON-A rapidly changes from 0.6 V to 0.72 V and then gradually returns to 0.6 V. The reason is as follows. First the resistance value of the variable resistances 671 and 672 approaches to each other in response to the signal vca as described with reference to FIG. 2B.

However, since the pulsed voltage rise of the signal PA caused by the rise of the voltage of signal vca turns on the switch MOS transistor MOS-SW 650 to cause the voltage of the signal GA to become equal to the ground potential, the power MOS transistor MOS-PW 640 turns on completely and accordingly the reduced voltage Vddma becomes 1.2 V.

As a result, the voltage of the signal MON-A increases from 0.6 V to 0.72 V. When the voltage of the signal PA raised drops to the ground potential, the voltage of the signal GA increases from the ground potential to the voltage equal to the voltage output from the differential amplifier 610.

Then the reduced voltage Vddma is regulated from 1.2 V to 1.0 V so that the voltage of MON-A becomes equal to VREF of 0.6 V.

If the signal GA were not forced to the ground potential and the resistance values of the variable resistances 671 and 672 of the dividing ratio variable voltage divider 670 were changed to decrease the voltage of the signal MON-A in order to increase the reduced voltage Vddma, the differential amplifier 610 would control the signal GA so that the signal GA increases the reduced voltage Vddma to return the signal MON-A to 0.6 V. In that case, a delay due to the capacity and inductance of the GA signal line and a delay due to the time requested for charging the internal circuit A and the stabilizing capacitance CA would degrade the response speed when the differential amplifier 610 returns the voltage of the signal GA to 0.6 V. If the driving capability of the differential amplifier 610 were increased in order to achieve fast control in that situation, the voltage of the signal GA would oscillate. As a result, the reduced voltage Vddma would also oscillate. It takes a certain amount of time for the voltage of the signal GA to stabilize and it also takes a certain amount of time for the reduced voltage Vddma stabilize. Since operation of the internal circuit A is unstable while the reduced voltage Vddma is unstable, it would be necessary to provide an interval during which the operation of the internal circuit A is being deactivated.

In contrast, in the embodiment described with respect to FIG. 2C, when switching from DVFS mode 0 to DVFS mode 2 occurs, the power MOS transistor MOS-PW 640 is turned on completely, the voltage of the signal GA is forced to the ground potential, the internal circuit A and the stabilizing capacitance CA are charged, then the voltage of the signal GA is regulated to the voltage used in DVFS mode 2. Accordingly, the reduced voltage Vddma temporarily increases to 1.2 V but then decreases because of current consumption in the internal circuit A. The voltage of the signal GA provided by the differential amplifier 610 to the gate of the power MOS transistor MOS-PW 640 gradually increases from 0 V. By limiting the driving capability of the differential amplifier 610 so as to prevent oscillation of the signal GA, the reduced voltage Vddma is caused to decrease gradually and monotonically. Accordingly, the voltage output from the dividing ratio variable voltage divider 670 also monotonically decreases. Since this operation gradually decreases the reduced voltage Vddma from a value higher than a requested value to the requested value, the internal circuit A may be quickly activated without waiting for the signal GA to stabilize at a predetermined voltage. Consequently, the amount of time during which the internal circuit A 200 is not operating may be reduced.

Figure 3:
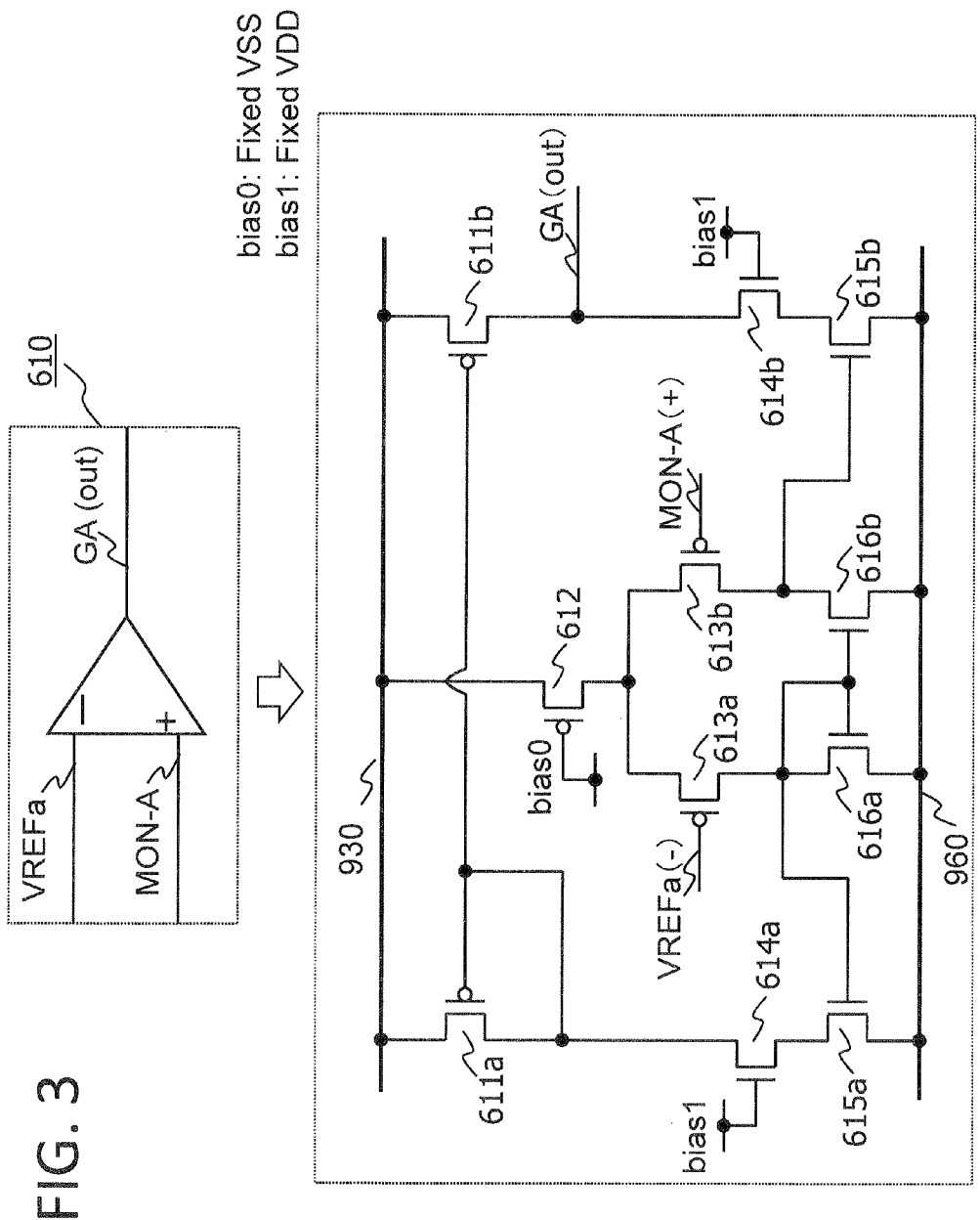
FIG. 3 is a diagram illustrating details of a differential amplifier 610 in the regulator 600.

FIG. 3 is a circuit diagram illustrating details of the differential amplifier 610 in the regulator 600. The differential amplifier 610 receives the signals VREFa and MON-A and outputs the signal GA.

The differential amplifier 610 includes p-MOS transistors 611*a*, 611*b*, 612, 613*a* and 613*b* and n-MOS transistors 614*a*, 614*b*, 615*a*, 615*b*, 616*a* and 616*b*.

The source of the p-MOS transistor 611*a* is connected to the power line VDD 930, the drain is connected to the drain of the n-MOS transistor 614*a*, and the gate is connected to the gate of the p-MOS transistor 611*b* and to the drain of the p-MOS transistor 611*a* itself.

The drain of the n-MOS transistor 614*a* is connected to the source of the n-MOS transistor 615*a* and the gate is connected to a bias 1. The voltage of the bias 1 is fixed at the same voltage as the voltage of the power line VDD 930.

The source of the n-MOS transistor 615*a* is connected to the ground line VSS 960, the gate is connected to the drain and gate of the n-MOS transistor 616*a* and to the drain of the p-MOS transistor 613*a*.

In this way, the p-MOS transistor 611*a*, the n-MOS transistor 614*a*, and the n-MOS transistor 615*a* are connected through the sources or the drains. That is, the three transistors are connected in series between the power line VDD 930 and the ground line VSS 960 to form a first current path.

The source of the p-MOS transistor 611*b* is connected to the power line VDD 930, the drain is connected to the drain of the n-MOS transistor 614*b*, and the gate is connected to the gate of the p-MOS transistor 611*a*.

The drain of the n-MOS transistor 614*b* is connected to the source of the n-MOS transistor 615*a* and the gate is connected to the bias 1. The voltage of the bias 1 is fixed at the same voltage as the voltage of the power line VDD 930.

The source of the n-MOS transistor 615*b* is connected to the ground line VSS 960 and the gate is connected to the drain of the n-MOS transistor 616*b* and to the drain of the p-MOS transistor 613*b*.

In this way, the p-MOS transistor 611*b*, the n-MOS transistor 614*b*, and the n-MOS transistor 615*b* are connected through the sources or drains. That is, the three transistors are connected in series between the power line VDD 930 and the ground line VSS 960 to form a second current path.

The source of the p-MOS transistor 612 is connected to the power line VDD 930, the drain is connected to the sources of the p-MOS transistors 613*a* and 613*b*, and the gate is connected to a bias 0. The voltage of the bias 0 is fixed at the same voltage as the voltage of the ground line VSS 960.

The gate of the p-MOS transistor 613*a* is connected to the signal VREFa and the drain is connected to the drain and gate of the n-MOS transistor 616*a* and to the gate of the n-MOS transistor 615*a*.

The gate of the p-MOS transistor 613*b* is connected to the signal MON-A and the drain is connected to the drain of the n-MOS transistor 616*b* and the gate of the n-MOS transistor 615*b*.

The source of the n-MOS transistor 616*a* is connected to the ground line VSS 960. The source of the n-MOS transistor 616*b* is connected to the ground line VSS 960 and the gate is connected to the gate of the n-MOS transistor 616*a* and the drain of the n-MOS transistor 616*a*.

In this way, the p-MOS transistor 613*a* and the n-MOS transistor 616*a* are connected in series at their drains to form a third current path. The p-MOS transistor 613*b* and the n-MOS transistor 616*b* are connected in series at their drains to form a fourth current path. The third and fourth current paths are provided in parallel between the drain of the p-MOS transistor 612 and the ground line VSS 960.

In the configuration described above, the voltage of the signal VREF received at the gate of the p-MOS transistor 613*a* is compared with the voltage of the signal MON-A received at the gate of the p-MOS transistor 613*b* and the voltage of the MOS-A is controlled by the dividing ratio variable voltage divider 670, which receives the signal vca, so that the voltage of the signal VREF becomes higher than the voltage of the signal MON-A, thereby increasing the on-state resistance of the p-MOS transistor 613a and decreasing the on-state resistance of the p-MOS transistor 613b.

As a result, the applied to the gate of the n-MOS transistor 615a decreases and the voltage applied to the gate of the n-MOS transistor 615b increases.

Then the on-state resistance of the n-MOS transistor 615a increases and the on-state resistance of the n-MOS transistor 615b decreases. Consequently, the voltage of the signal GA becomes lower than the voltage of the signal GA when the voltage of the signal VREF was equal to the voltage of the signal MON-A.

Accordingly, the current driving capability of the power MOS transistor MOS-PW 640 increases to exceed the current consumption capacity of the internal circuit A200 and the reduced voltage Vddma increases.

Thus, the voltage of the signal MON-A output from the dividing ratio variable voltage divider 670 increases.

However, it takes a certain amount of time for the reduced voltage Vddma to increase and it also takes a certain amount of time to detect a rise in the voltage of the signal MON-A. The voltage of the signal MON-A, the reduced voltage Vddma, and the voltage of the signal GA go up and down and ultimately the reduced voltage Vddma settles at a level such that the current driving capability of the power MOS transistor MOS-PW 640 counterbalances the current consumption capacity of the internal circuit A 200, that is, a voltage level such that the voltage of the signal MON-A becomes equal to the voltage of the signal VREF.

In summary, it takes a certain amount of time for the reduced voltage Vddma which are going up and down to settle after the reduced voltage Vddma is controlled by the dividing ratio variable voltage divider 670, which receives the signal vca, so that the voltage of the signal MON-A drops below the voltage of the signal VREF.

Figure 4:
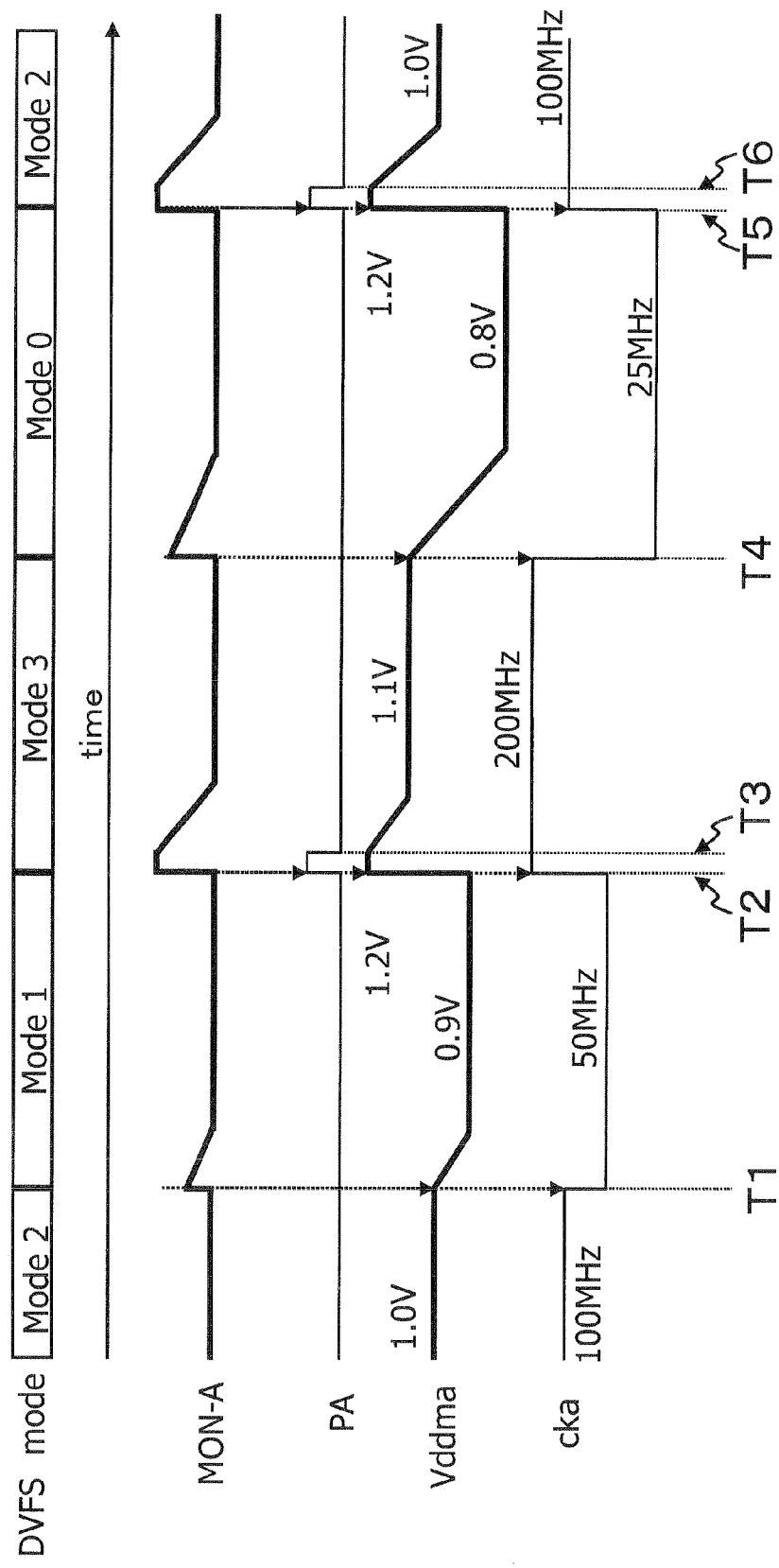
FIG. 4 is a timing diagram illustrating changes in voltage of the signals relating to an operation of the regulator 600 with time for explaining the operation of the regulator 600.

Therefore, the regulator 600 includes the pulse generator 660 that generates the signal PA that is pulsed by a rise of the voltage of the signal vca when the DVFS mode changes in the direction that increases the clock frequency, as illustrated in FIG. 4, and the switch MOS transistor MOS-SW 650 that receives the signal PA and reduces the signal GA to the ground voltage.

In the foregoing, the operation relating to generation of the signal PA by the pulse generator 660 has been described with respect to the signal vca that is an analog signal. It will be understood that if the signal vca is a digital signal, the pulse generator 660 outputs a pulse signal as the signal PA when the logical value of any of the bits of the signal vca has changed.

FIG. 4 is a timing diagram illustrating changes in voltage of the signals relating to the operation of the regulator 600 with time for explaining the operation of the regulator 600.

At time T1, a change from DVFS mode 2 to DVFS mode 1 occurs and the frequency of the internal clock signal cka distributed from the PMU 400 changes from 100 MHz to 50 MHz. In response to the signal vca from the PMU 400, the dividing ratio variable voltage divider 670 changes the ratio between the resistance value of the resistance 671 and the resistance value of the resistance 672 so as to increase the voltage of the signal MON-A. The signal PA is held at logical low. As a result, the voltage of the signal GA increases, the driving capability of the power MOS transistor MOS-PW 640 decreases, and the reduced voltage Vddma gradually and monotonically decreases to 0.9 V. Since the minimum voltage requested for 50-MH operation is 0.9 V and the reduced voltage Vddma certainly is at least 0.9 V during the period in which the voltage Vddma gradually and monotonically decreases, 50-MHz operation may be started in this period without waiting over the period of time.

At time T2, a change from DVFS mode 1 to DVFS mode 3 occurs and the frequency of the system clock signal cka changes from 50 MHz to 200 MHz. In response to the signal vca from the PMU 400, the dividing ratio variable voltage divider 670 changes the ratio between the resistance values of the resistances 671 and 672 so that the voltage of the signal MON-A is decreased (so that the resistance values of the resistances 671 and the 672 approach to each other). The signal PA becomes logical high at time T2 and stays high until time T3.

As a result, the switch MOS transistor MOS-SW 650 turns on and therefore the voltage of the signal GA becomes the ground level and stays at the ground level at time T2 until time T3.

When the voltage of the signal GA is forced to the ground level in this way, no feedback is provided from the differential amplifier 610 to the voltage of the signal GA during the period between times T2 and T3.

Accordingly, the driving capability of the power MOS transistor MOS-PW 640 peaks in the period between times T2 and T3, the power MOS transistor MOS-PW 640 turns on completely, and the reduced voltage Vddma becomes 1.2 V. Thus, the internal circuit A and the stabilizing capacitance CA are charged to 1.2 V.

Then, at time T3, the signal PA returns to logical low. As a result, the switch MOS transistor MOS-SW 650 turns off. On and after time T3, the differential amplifier 610 drives the voltage of the signal GA so that the voltage of the signal MON-A becomes 0.6 V. That is, the differential amplifier 610 drives so that the voltage of the signal GA increases.

Consequently, the driving capability of the power MOS transistor MOS-PW 640 start to decrease at time T3 and therefore the reduced voltage Vddma start to decrease toward 1.1 V. The voltages of the internal circuit A and the stabilizing capacitance CA start decreasing by discharge. The reduced voltage Vddma decreases at a slower rate than the rate at which the differential amplifier 610 detects the difference between the voltage of the signal MON-A and the reference voltage, because the current supply capability per unit time of a capacitance of the internal circuit A and the stabilizing capacitance CA is greater than the power consumption per unit time in the internal circuit A at voltages near the voltage of the power line VDD 930. Therefore, the feedback control provided though the signal GA from the differential amplifier 610 to the reduced voltage Vddma is stabilized, overshoot or undershoot in the voltage of the signal GA and the reduced voltage Vddma may not occur and the signal GA and the reduced voltage Vddma may not oscillate.

Here, consider an operation in which the reduced voltage Vddma is increased from a voltage lower than 1.1 V to 1.1 V, unlike the operation described above. When the driving capability of the differential amplifier is increased in order to accelerate the rise of the reduced voltage Vddma, the current supply capability of the power MOS transistor MOS-PW 640 exceeds the current consumption capacity of the internal circuit A and the stabilizing capacitance CA. Therefore the voltage rise rate of the reduced voltage Vddma becomes higher than the rate at which the differential amplifier 610 detects the difference between the voltage of the signal MON-A and the reference voltage. In consequence, feedback control provided through the signal GA from the differential amplifier 610 to the reduced voltage Vddma becomes unstable, overshoot or undershoot in the voltage of the signal GA and the reduced voltage Vddma may occur, and the voltage of the signal GA and the reduced voltage Vddma may oscillate.

According to the present invention, the reduced voltage Vddma is first increased to the voltage of the power line VDD 930 then is lowered to 1.1 V. Since the voltage Vddma has been raised higher than the voltage requested to operate the internal circuit A, the internal circuit A may start operating without waiting for the lowering voltage Vddma to stabilize at 1.1 V.

At time T4, a change from DVFS mode 3 to DVFS mode 0 occurs and the frequency of the system clock signal cka distributed from the PMU 400 changes from 200 MHz to the 25 MHz. In response to the signal vca from the PMU 400, the dividing ratio variable voltage divider 670 changes the ratio between the resistance values of the resistances 671 and 672 so that the voltage of the signal NON-A increases. The signal PA is held at logical low. As a result, the voltage of the signal GA gradually increases and the driving capability of the power MOS transistor MOS-PW 640 gradually decreases. Accordingly, the reduced voltage Vddma gradually and monotonically decreases toward 0.8 V. Here, since the minimum voltage requested for 25-MHz operation is 0.8 V and the reduced voltage Vddma is certainly at least 0.8 V during the period in which the voltage Vddma gradually and monotonically decreases, 25-MHz operation may be started without waiting over the period of time.

At time T5, a change from DVFS mode 0 to DVFS mode 2 occurs and the frequency of the system clock signal cka changes from 25 MHz to 100 MHz. In response to the signal vca from the PMU 400, the dividing ratio variable voltage divider 670 changes the ratio between the resistance values of the resistances 671 and 672 so that the voltage of the signal MON-A decreases (so that the resistance values of the resistances 671 and 672 approach to each other). The signal PA becomes logical high at time T5 and stays logical high until time T6, then returns to logical low. Accordingly, the switch MOS transistor MOS-SW 650 turns on and therefore the voltage of the signal GA decreases to the ground level at time T5 and stays at the ground level until time T6. On and after time T6, the differential amplifier 610 drives the voltage of the signal GA so that the voltage of the signal MON-A becomes 0.6 V. The driving capability of the power MOS transistor MOS PW 640 peaks in the period between time T5 and time T6 and the reduced voltage Vddma increases to 1.2 V. After time T6, the reduced voltage Vddma gradually and monotonically decreases toward 1.0 V. Since the minimum voltage requested for 100-MHz operation is 1.0 V and the voltage Vddma is certainly at least 1.0 V during the period in which the voltage Vddma gradually and monotonically decreases, 100-MHz operation may be started without waiting over the period of time.

FIGS. 5A, 5B and 5C illustrate an operation of a pulse generator 660 which generates a signal PA in response to a signal vca. Here, the signal vca is a digital signal made up of three bits and the pulse generator 660 outputs a pulse signal as the signal PA in response to a change of the logical value of each bit of the signal vca. Generation of the pulse signal will be described below.

FIG. 5A is a circuit diagram of the pulse generator 660. The pulse generator 660 includes signal delay elements 661a and 661b, inverters 662a and 662b, an AND element 665, an OR element 664, an AND element 665, and OR elements 666 and 667.

The signal delay element 661a receives a signal vca [0] representing the first bit of the signal vca and outputs the delayed signal vca [0] to an input terminal of the inverter 662a. The inverter 662a logically inverts the delayed signal vca [0] and outputs the inverted signal to a first input terminal of the AND element 663a. The AND element 663a receives the signal vca [0] at a second input terminal and outputs the AND of the signal received at the first input terminal and the signal received at the second input terminal from the output terminal.

The signal delay element 661a, the inverter 662a, and the AND element 663a thus forms a circuit that receives the signal vca [0] and outputs a logical "1" pulse signal from the output terminal of the AND element 663a when the logic of the signal vca [0] changed from "0" to "1".

The signal delay element 661b receives a signal vca [1] representing the second bit of the signal vca and outputs the delayed signal vca [1] to the input terminal of the inverter 662b. The inverter 662b logically inverts the delayed signal vca [1] and outputs the inverted signal to a first input terminal of the AND element 663b. The AND element 663b receives the signal vca [1] at a second input terminal and outputs the AND of the signal received at the first input terminal and the signal received at the second input terminal from the output terminal.

The signal delay element 661b, the inverter 662b and the AND element 663b thus forms a circuit that receives the signal vca [1] and outputs a logical "1" pulse signal from the output terminal of the AND element 663b when the logic of the signal vca [1] changed from "0" to "1".

The OR element 664 receives the signal vca [1] at a first input terminal, receives the output from the inverter 662b at a second input terminal, and outputs the OR of the signal received at the first input terminal and the signal received at the second input terminal to a second input terminal of the AND element 665. Thus, the OR element 664 is a circuit that outputs a logical "0" pulse signal when the signal vca [1] changes from logical "1" to logical "0", that is when a borrow occurred in the second bit of the signal vca.

The AND element 665 receives the output from the AND element 663a at a first input terminal, receives the output from the OR element 664 at the second input terminal, and outputs the AND of the signal received at the first input terminal and the signal received at the second input terminal to a first input terminal of the OR element 666. When a borrow occurred in the second bit of the signal vca, the AND element 665 receives a logical "0" pulse signal from the OR element 664 and prevents a logical "1" pulse signal generated by the AND element 663a when a carry occurred in the first bit of the signal vca at the same time as the borrow from passing to the OR element 666.

The OR element 666 receives the output from the AND element 665 at the first input terminal, receives an output from the AND element 663b at a second input terminal, and outputs the OR of the signal received at the first input terminal and the signal received at the second input terminal to a first input terminal of the OR element 667. That is, the OR element 666 passes a logical "1" pulse signal generated when the logic value of the first or second bit of the signal vca changes from "0" to "1" to the OR element 667.

The OR element 667 receives the output from the OR element 666 at a first input terminal, receives a signal representing the third bit of the signal vca at a second input terminal, and outputs the OR of the signal received at the first input terminal and the signal received at the second input terminal as a signal PA. The OR element 667 generates a logical "1" pulse signal when the logic value of the first or second bit of the signal vca changed from "0" to "1". The OR element 667 continues outputting the logical "1" signal during a period in which the third bit of signal vca is logical "1", that is, in the period of DVFS mode 4.

FIG. 5B is a table listing the logical values of the bits of the signal vca corresponding to DVFS modes. The column "DVFS mode" contains modes. The column "CLK Freq./PW vol." contains system clock frequency and reduced voltage Vddma that are provided to the internal circuit A 200 or B 300 in each mode. The column "vca [2:0]" contains the logical values of the signal vca that represent the DVFS modes: mode 0 is represented by "000", mode 1 is represented by "001", mode 2 is represented by "010", mode 3 is represented by "011" and mode 4 is represented by "100". However, mode 4 does not necessarily need to be represented by "100" in the operation of the pulse generator 660 illustrated in FIG. 5A; mode 4 only need to be represented by "1xx", where x represents "1" or "0".

FIG. 5C is a timing chart of the signal PA output from the pulse generator 660. There are DVFS mode changes in the period from time T1 to time T9. A carry occurs in the signal vca at times T1, T3, T5, T7 and T9 among the times at which the DVFS mode changes. Accordingly, the pulse generator 660 outputs a logical "1" pulse signal as the signal PA at times T1, T3, T5, T7 and T9. Since the change at time T5 is to mode 4, the logical "1" signal is output during the period of mode 4 as the signal PA.

Figure 6B:
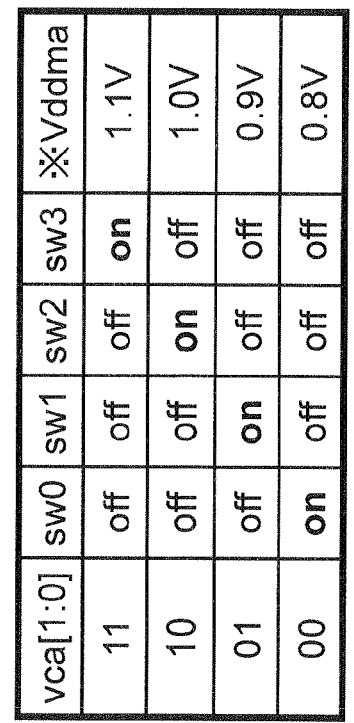
FIGS. 6A and 6B are diagrams illustrating an example of a dividing ratio variable voltage divider 670.
Figure 6A:
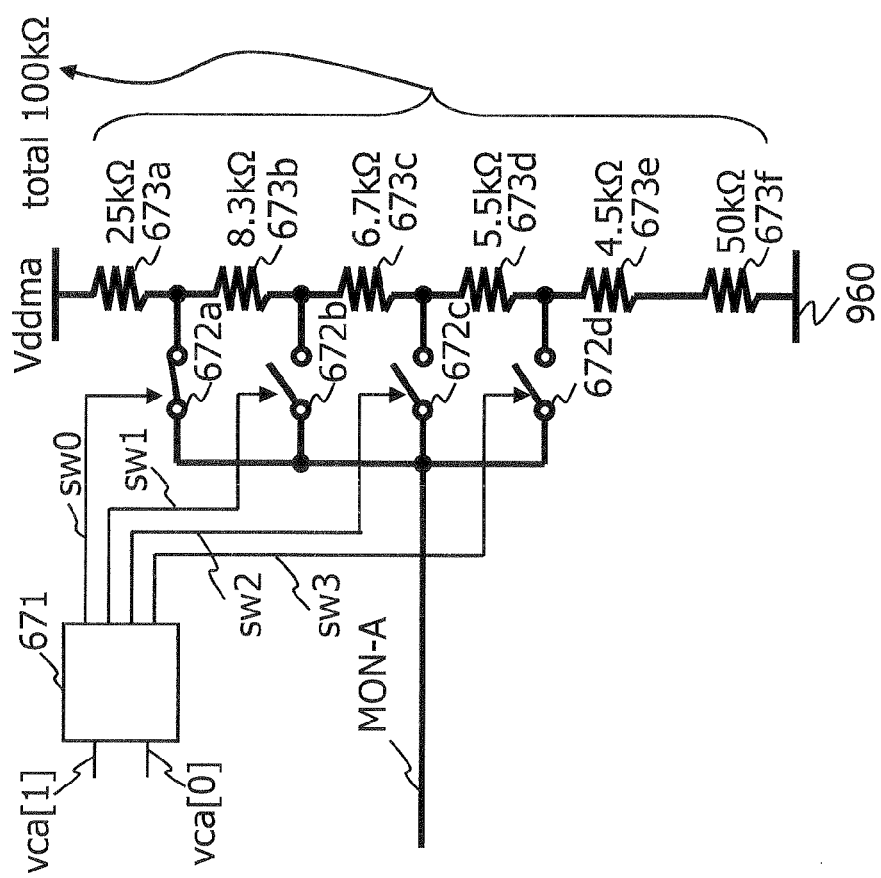

FIGS. 6A and 6B are diagrams for explaining a specific example of the dividing ratio variable voltage divider 670. FIG. 6A illustrates exemplary circuitry of the dividing ratio variable voltage divider 670. It is assumed in the example that the signal vca is a digital signal.

The dividing ratio variable voltage divider 670 includes a decoder 671, switches 672a, 672b, 672c and 672d, and resistances 673a, 673b, 673c, 673d, 673e and 673f.

The decoder 671 receives the two low-order bits of the signal vca, signals vca [1] and vca [0], and outputs signals sw0, sw1, sw2 and sw3 that control the on and off of the switches 672a, 672b, 672c and 672d as illustrated in FIG. 6B.

When the reduced voltage Vddma is to be forced to 0.8 V, the switch 672a turns on to connect to a node between the resistances 673a and 673b. When the reduced voltage Vddma is to be forced to 0.9 V, the switch 672b turns on to connect to a node between the resistances 673b and 673c. When the reduced voltage Vddma is to be forced to 1.0 V, the switch 672c turns on to connect to a node between the resistances 673c and 673d. When the reduced voltage Vddma is to be forced to 1.1 V, the switch 672d turns on to connect to a node between the resistances 673d and 673e.

The resistances 673a, 673b, 673c, 673d, 673e and 673f are connected in series between the reduced voltage Vddma and the ground line VSS 960. The total series resistance is 100 K ohms and resistance values of the resistances 673a, 673b, 673c, 673d, 673e and 673f are 25 K ohms, 8.3 K ohms, 6.7 K ohms, 5.5 K ohms, 4.5 K ohms, and 50 K ohms, respectively.

FIG. 6B is a table of the logics represented by the two low-order bits of the signal vca and the associated states of the switches indicated by signals SW0, SW1, SW2 and SW3.

Referring to the table in FIG. 6B, SW0 indicates the on state when the signal vca [1:0]=(00), SW1 indicates the on state when the signal vca [1:0]=(01), SW2 indicates the on state when the signal vca [1:0]=(10), and SW3 indicates the on state when the signal vca [1:0]=(11).

FIGS. 7A and 7B illustrate exemplary circuitry of the system clock generator A 430 included in the PMU 400. FIG. 7A illustrates the system clock generator A 430. The system clock generator A 430 includes a phase lock loop (PLL) 431, a divide-by-32 divider 432, a divide-by-2 divider 433, a divide-by-4 divider 434, a divide-by-8 divider 435, a divide-by-16 divider 436 and a selector 437.

The PLL 431 receives a system clock sclk 950 having a frequency of 12.5 MHz, produces a clock n4 having a frequency of 400 MHz, and compares the rising edges of the clocks to keep the phases of the clock n4 and the system clock sclk 950 matched.

The divide-by-32 divider 432 increases a period of the clock n4 produced by the PLL 431 by a factor of 32 to produce a clock having a frequency of 12.5 MHz for phase comparison with the system clock sclk 950.

The divide-by-2 divider 433 increases a period of the clock n4 produced by the PLL 431 by a factor of 2 to produce a clock n3 having a frequency of 200 MHz for phase comparison with the system clock sclk 950.

The divide-by-4 divider 434 increase a period of the clock n4 produced by the PLL 431 by a factor of 4 to produce a clock n2 having a frequency of 100 MHz for phase comparison with the system clock sclk 950.

The divide-by-8 divider 435 increase a period of the clock n4 produced by the PLL 431 by a factor of 8 to produce a clock n1 having a frequency of 50 MHz for phase comparison with the system clock sclk 950.

The divide-by-16 divider 436 increases a period of the clock n4 produced by the PLL 431 by a factor of 16 to produce a clock n0 having a frequency of 25 MHz for phase comparison with the system clock sclk 950.

The selector 437 selects a clock having a frequency corresponding to a DVFS mode signal 940 from among the clocks n0, n1, n2, n3, and n4 and outputs the clock as the clock cka.

FIG. 7B is a table summarizing the frequencies of the clocks generated by the system clock generator A 430 for the DVFS modes.

The column "DVFS mode" contains modes, from a low-load state, mode 0, to a high-load state, mode 4.

The signal dvfsa [2:0] is a digital signal made up of three bits constituting the DVFS mode signal 940 depicted in FIG. 7A. The column "dvfsa [2:0]" in FIG. 7B indicates binary numbers corresponding to the DVFS modes: "000" corresponds to mode 0, "001" corresponds to mode 1, "010" corresponds to mode 2, "011" corresponds to mode 3, and "1xx" corresponds to mode 4, where x may be 0 or 1.

The column "Selector" contains clocks n0 to n4 selected by the selector 437 depicted in FIG. 7A for the DVFS mode signal 940. Clock n4 is selected for mode 4, n3 is selected for mode 3, n2 is selected for mode 2, n1 is selected for mode 1, and n0 is selected for mode 0.

The "cka frequency" indicates the clock frequencies of the clocks n4 to n0 corresponding to the DVFS mode signal 940. The frequency of clock n4 is 400 MHz, the frequency of clock n3 is 200 MHz, the frequency of clock n2 is 100 MHz, the frequency of clock n1 is 50 MHz, and the frequency of clock n0 is 25 MHz.

In summary, a semiconductor circuit device (the semiconductor circuit device 100) includes:

a power line (the VDD 930) receiving a voltage supply from an external power source;

a set of circuits (the internal circuit A 200) embedded in the semiconductor circuit device, the set of circuits having a plurality of operation modes with different operating voltages;

a power supply circuit (the regulator 600) electrically connected to the set of circuits and the power line, the power supply circuit supplying a voltage lower than or equal to the voltage of the power line to the set of the circuits; and a control circuit (the PMU 400) controlling the power supply circuit (the regulator 600) in accordance with each of the plurality of operation modes;

wherein, when the operation mode of the set of circuits changes and if the operating voltage for the operation mode after the change is higher than the operating voltage for the operation mode before the change, the control circuit causes the power supply circuit to supply a voltage higher than the operating voltage for the operation mode after the change to the set of circuits and then to supply the operating voltage for the operation mode after the change to the set of circuits.

A semiconductor circuit device (the semiconductor circuit device 100) includes:

a power line (the VDD 930) receiving a voltage supply from an external power source;

a set of circuits (the internal circuit A 200 and the stabilizing capacitance ca 250) embedded in the semiconductor circuit device, the set of circuits having a plurality of operation modes with different operating voltages;

a power supply circuit (the regulator 600) electrically connected to the set of circuits and the power line, the power supply circuit supplying a voltage lower than or equal to the voltage of the power line to the set of circuits; and a control circuit (the PMU 400) controlling the power supply circuit in accordance with each of the plurality of operation modes;

wherein the power supply circuit (the regulator 600) includes:

a power supply MOS transistor (the power MOS transistor MOS-PW 640) electrically connected to the power line (the VDD 930) and the set of circuits;

an indication circuit (the differential amplifier 610) outputting an indication signal (the signal GA) to a gate electrode of the power supply MOS transistor under the control of the control circuit (the PMU 400 and the signal vca), the control being dependent on each of the operation modes; and a switch (the switch MOS transistor MOS-SW) electrically connected to the gate electrode and a ground line (the VSS 960), the switch receiving a pulse signal dependent on the control by the control circuit and electrically connecting the gate electrode to the ground line during a pulse duration to force the voltage at the gate electrode to a ground level.

The power supply circuit (the regulator 600) further includes:

a voltage divider (the dividing ratio variable voltage divider 670) electrically connected between the source of the power supply MOS transistor and the ground line (the VSS 960) in parallel with the set of circuits, the voltage divider outputting a fractional voltage (MON-A630), the fractional voltage being produced by reducing the voltage between the source of the power supply MOS transistor and the ground line by a factor that is dependent on control by the control circuit (the PMU 400 and the signal vca); and a pulse generator (the pulse generator 660) generating the pulse signal dependent on control by the control circuit;

wherein the indication circuit electrically outputs the indication signal (the signal GA) to the gate electrode of the power supply MOS transistor in accordance with a result of comparison between a reference voltage (the reference voltage from the VREF generator) and the fractional voltage.

When a switching occurs from a low operation mode in which the operating voltage of the set of circuits is low to a high operation mode in which the operating voltage of the set of circuits is high among the operation modes of the set of circuits, the pulse generator (the pulse generator 660) generates the pulse signal in response to control by the control circuit relating to the high operation mode.

When a switching occurs to a maximum voltage operation mode in which the operating voltage of the set of circuits is equal to the voltage of the power line (the VDD 930) among the operation modes of the sets of circuits, the pulse generator (the pulse generator 660) generates the pulse signal having a pulse width equivalent to an entire period during which the set of circuits are in the maximum voltage operation mode.

In the semiconductor circuit device (the semiconductor circuit device 100), current supplied per unit time from a capacitance of the set of circuits is greater than current consumed per unit time in the set of circuits while a voltage higher than the operating voltage for the operation mode after the change is being applied to the set of circuits; and the per-unit-time current supply capability of the power supply MOS transistor is higher than the current consumed per unit time in the set of circuits.

In the semiconductor circuit device, when the set of circuits (the internal circuit A) requests an operating voltage (Vddma) higher than the operating voltage in the previous operation mode because of a rise of the operating frequency after a change of the operation mode of the set of the circuits (the internal circuit A), the power supply circuit (the power MOS transistor MOS-PW 640) first supplies a voltage equal to the voltage of the power line to the set of circuits (the internal circuit A) and then supplies the operating voltage (Vddma) requested for the operation mode after the change in accordance with control by the control circuit (the PMU 400 and the signal vca). This operation stabilizes the operating voltage (Vddma) supplied from the power supply circuit (the power MOS transistor MOS-PW 640) in a short time after the operation mode switching.

Therefore, in the semiconductor circuit device according to the first embodiment described above, the set of circuits may start operating quickly without waiting for the operating voltage to stabilize after the change of the operating voltage (Vddma).

Second Embodiment

Figure 8A:
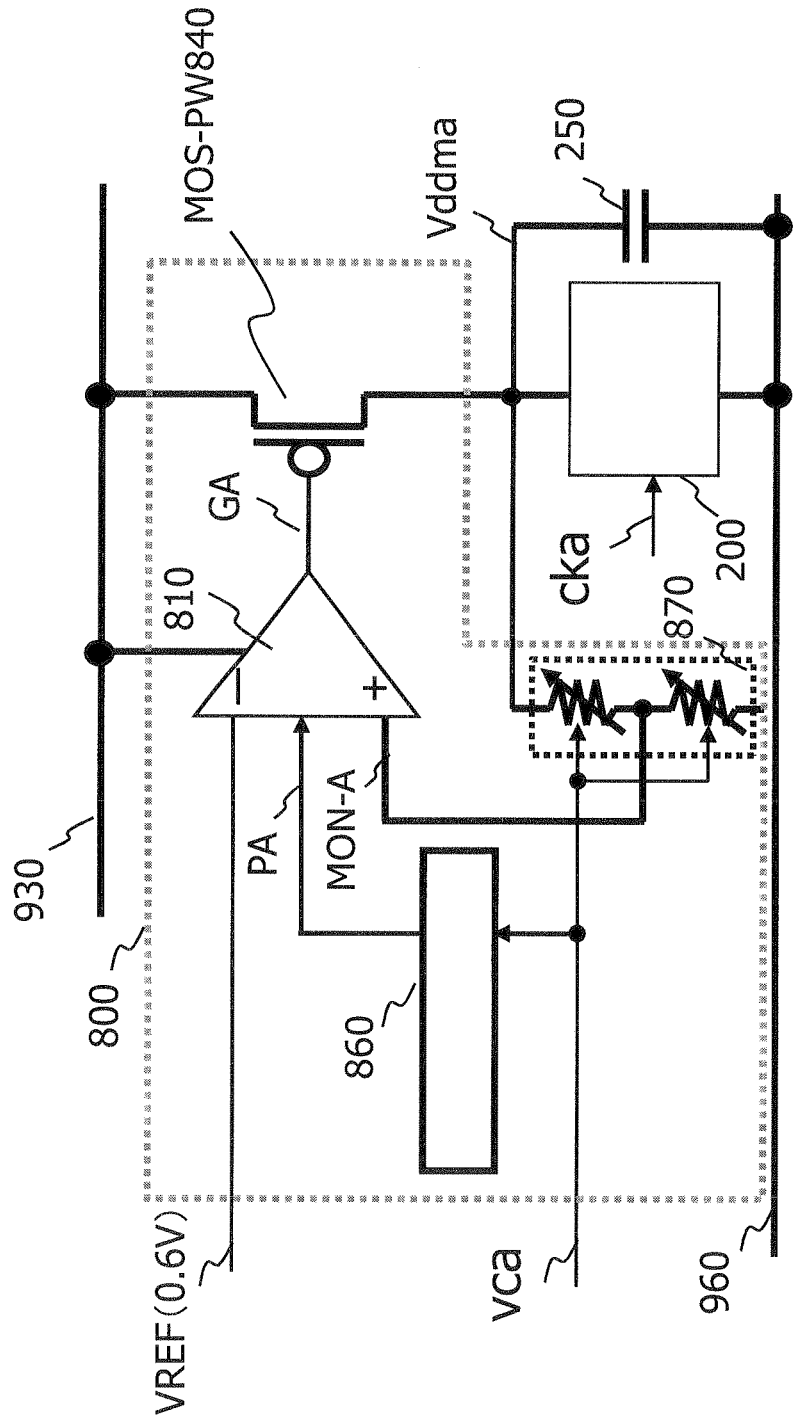
FIG. 8A is a diagram illustrating a regulator 800 according to a second embodiment.
Figure 8B:
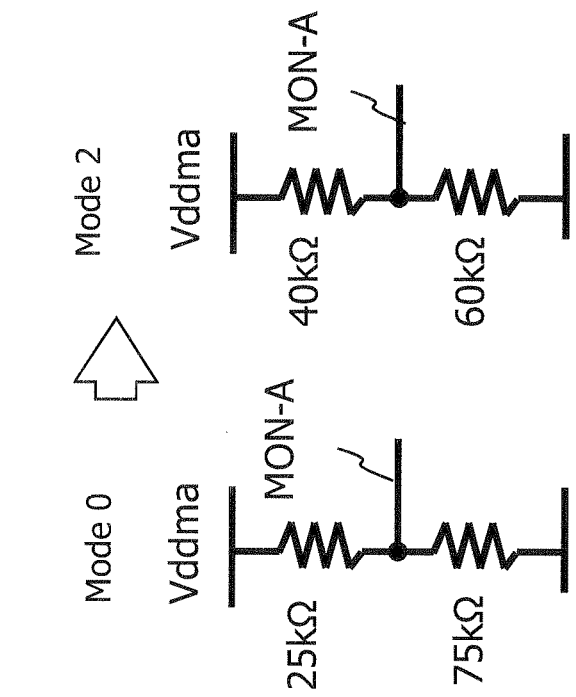
FIGS. 8B and 8C are diagrams illustrating the regulator 800 according to the second embodiment.
Figure 8C:
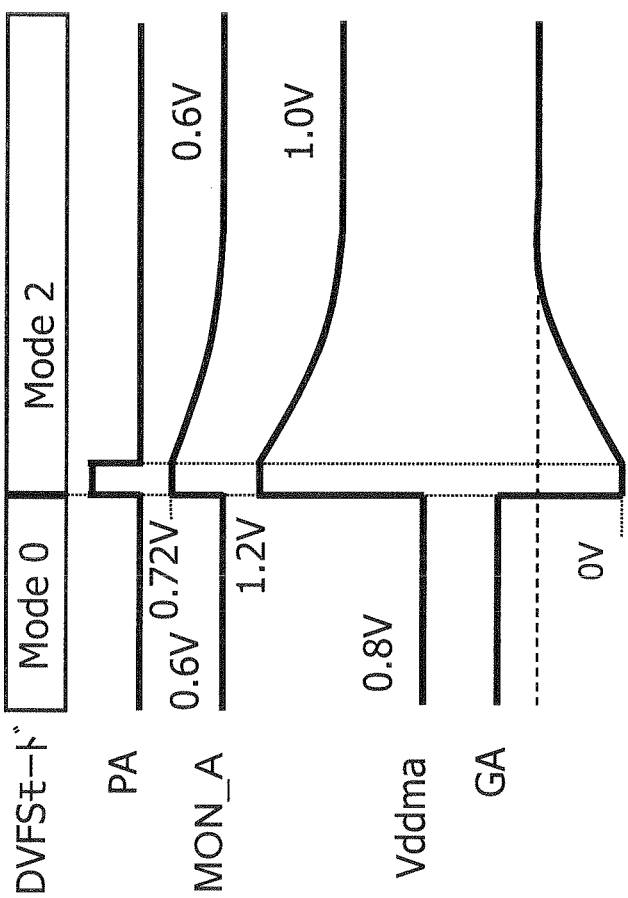

FIGS. 8A, 8B and 8C illustrate a regulator 800 according to a second embodiment. FIG. 8A illustrates the regulator 800, an internal circuit A 200, and a stabilizing capacitance ca 250.

The regulator 800 includes a differential amplifier 810, a power MOS transistor MOS-PW 840, a pulse generator 860, and a dividing ratio variable voltage divider 870.

The differential amplifier 810 receives a signal MON-A from the dividing ratio variable voltage divider 870 and a signal VREFa that supplies a reference voltage of 0.6 V, amplifies the difference between the signals, and outputs the amplified difference voltage to the power MOS transistor MOS-PW 640 as a signal GA. Unlike the differential amplifier 610, the differential amplifier 810 outputs a GA signal having a ground voltage to the power MOS transistor MOS-PW 840 while the differential amplifier 810 is receiving a pulse signal from the pulse generator 860.

Here, the differential amplifier 810 operates with a voltage of 1.2 V supplied through a power line VDD 930 and the ground voltage supplied through a ground line VSS 960.

When a switching to a DVFS mode that requests a higher reduced voltage Vddma occurs in response to a signal vca representing the DVFS mode, the dividing ratio variable voltage divider 870 increases the resistance value of a variable resistance 871 in the dividing ratio variable voltage divider 870 and decreases the resistance value of a variable resistance 872 to reduce the difference between the resistance values, thereby reducing the voltage of the signal MON-A. As a result, the voltage of the signal GA decreases whereas the reduced voltage Vddma increases. On the other hand, when a switching to a DVFS mode that request a lower reduced voltage Vddma occurs, the dividing ratio variable voltage divider 870 changes the resistance values so that the voltage of the signal MON-A increases. The variable resistances 871 and 872 are connected in the same way as in the dividing ratio variable voltage divider 670, as will be described with reference to FIG. 8B.

The power MOS transistor MOS-PW 840 changes its driving capability in accordance with the voltage of the signal GA. As the voltage of the signal GA approaches the ground voltage, the current driving capability of the power MOS transistor MOS-PW 840 approaches its maximum, which operation is the same as the operation of the power MOS transistor MOS-PW 640.

When a predetermined change occurs in the voltage of a signal VCA from a PMU 400, the pulse generator 860 outputs a PA signal (pulse signal) that has a positive voltage for a predetermined duration, if the signal VCA is an analog signal.

If the signal VCA is a digital signal made up of several bits, the pulse generator 860 outputs a pulse signal as the signal PA when the logic value of any of bits changes in response to a change from a DVFS mode in which the frequency of a system clock is lower to a DVFS mode in which the frequency of the system clock is higher.

The pulse generator 860 operates with a voltage supplied through the power line VDD 930 and the ground voltage supplied through the ground line VSS 960.

FIG. 8B illustrates an operation and a configuration of the dividing ratio variable voltage divider 870. The dividing ratio variable voltage divider 870 includes variable resistances 871 and 872 connected in series between the power line that transmits a reduced voltage Vddma and the ground line VSS 960. Operation of the dividing ratio variable voltage divider 870 according to DVFS mode is the same as that of the dividing ratio variable voltage divider 670. For example, in the left-hand part of FIG. 8B, the resistance value of the variable resistance 871 is 25 kilo-ohms and the resistance value of the variable resistance 872 is 75 kilo-ohms in DVFS mode 0. In the right-hand part of FIG. 8B, the resistance value of the variable resistance 871 is 40 kilo-ohms and the resistance value of the variable resistance 872 is 60 kilo-ohms in DVFS mode 2.

FIG. 8C illustrates changes in voltage level of the signal from the regulator 800 and changes in the reduced voltage Vddma. The signal vca may be an analog signal having a voltage that changes according to the DVFS mode of the internal circuit A 200 or may be a digital signal made up of several bits. In that regard, the signal vca is the same as the signal vca in the regulator 600.

When the DVFS mode changes and the voltage of the signal vca changes in the direction that increases Vddma, the voltage of the signal PA, which is normally at the ground potential, becomes a positive level which has the shape of a pulse with a predetermined pulse width on the edge of the voltage change. In that regard, the signal PA is the same as the signal PA in the regulator 600.

When the DVFS changes from mode 0 to mode 2, the voltage of the signal MON-A rapidly increases from 0.6 V to 0.72 V, then gradually returns to 0.6 V. In that regard, the signal MON-A is the same as the signal MON-A in the regulator 600.

If the voltage of the signal GA output from the differential amplifier 810 were not set to the ground potential but the resistance values of the variable resistances 871 and 872 were changed to lower the voltage of the signal MON-A in order to increase the reduced voltage Vddma, the differential amplifier 810 performs control to lower the voltage of the output signal GA to increase the reduced voltage Vddma, thereby returning the voltage of the signal MON-A to 0.6 V. In that case, the voltage of the signal GA would oscillate when the differential amplifier 810 controls the signal GA to return the voltage of the signal MON-A to 0.6 V due to an imbalance between the driving capability of the differential amplifier 810 and the capacitance and inductance of the signal line of the signal GA and a mismatch between the driving capability of the differential amplifier 810 and the charges in the internal circuit A and the stabilizing capacitance CA. In consequence, the reduced voltage Vddma would also oscillate. It would take some time for the voltage of the signal GA to stabilize and it would also take time for the reduced voltage Vddma to stabilize. Since operation of the internal circuit A 200 is unstable while the reduced voltage Vddma is unstable, an interval during which the internal circuit A 200 is being deactivated would be provided.

In the embodiment, as illustrated in FIG. 8C, when a switching from DVFS mode 0 to DVFS mode 2 occurs, the voltage of the signal GA output from the differential amplifier 810 is first decreased to the ground potential, the internal circuit A and the stabilizing capacitance CA are charged, then the voltage of the signal GA is raised to a level for DVFS mode 2. Accordingly, the lowered voltage Vddma increases temporarily to 1.2 V but then decreases due to current consumption in the internal circuit A. The voltage of the signal GA provided by the differential amplifier 610 to the gate of the power MOS transistor MOS-PW 840 gradually increases from 0 V. By limiting the driving capability of the differential amplifier 810 so as to prevent oscillation of the signal GA, the reduced voltage Vddma is caused to decrease gradually and monotonically. Accordingly, the voltage output from the dividing ratio variable voltage divider 870 also monotonically decreases. Since this operation gradually decreases the reduced voltage Vddma from a value higher than a requested value to the requested value, the internal circuit A 200 may be quickly activated without waiting for the signal GA to stabilize at a predetermined voltage. Consequently, the amount of time during which the internal circuit A is not operating may be reduced.

Figure 9:
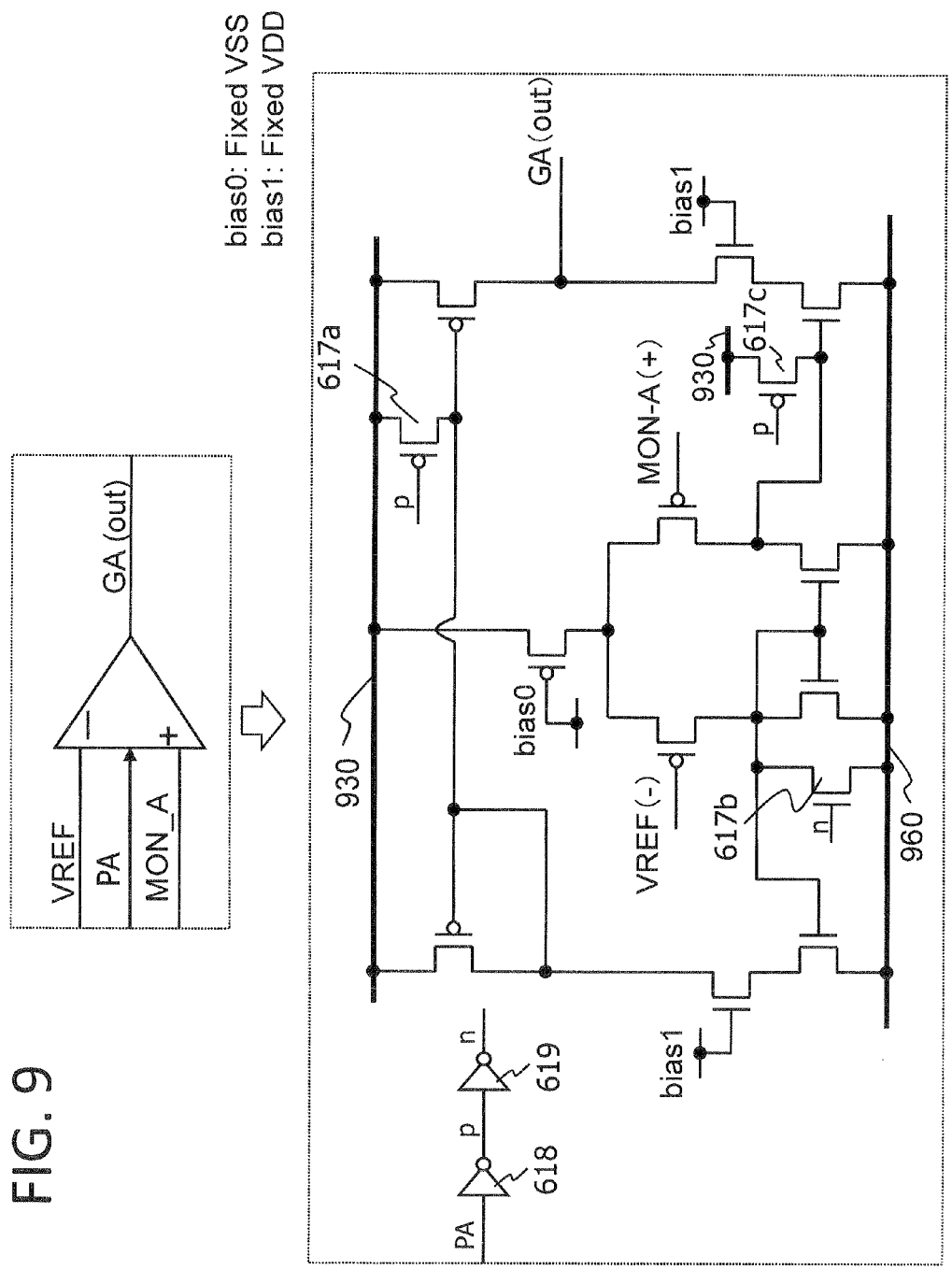
FIG. 9 is a diagram illustrating in detail the circuitry of a differential amplifier 810 in the regulator 800.

FIG. 9 illustrates details of the circuitry of the differential amplifier 810 in the regulator 800. The differential amplifier 810 receives signals VREFa, MON-A and PA and outputs a signal GA.

The differential amplifier 810 includes p-MOS transistors 611a, 611b, 612, 613a, and 613b and n-MOS transistors 614a, 614b, 615a, 615b, 616a and 616b. The transistors are connected in the same way as in the differential amplifier 610.

The differential amplifier 810 further includes inverters 618, 619, p-type transistors 617a and 617c and an n-type transistor 617b.

The inverter 618 receives the signal PA, inverts the logic of the signal PA, and outputs the inverted signal P. The inverter 619 receives the signal P, inverts the logic of the signal P, and outputs the inverted signal n.

The p-type transistor 617a has a source connected to the power line VDD 930, a drain connected to the gates of the p-MOS transistors 611a and 611b, and a gate connected to the signal P.

The p-type transistor 617c has a source connected to the power line VDD 930, a drain connected to the gate of the n-MOS transistor 615b, and a gate connected to the signal P.

The n-type transistor 617b has a source connected to the ground line VSS 960, a drain connected to the gate of the n-MOS transistor 615a, and a gate connected to the signal n.

With the configuration described above, the regulator 800 operates in the same way as the regulator 600 when the signal PA from the pulse generator 860 is not a logical high pulsed signal.

However, when the signal PA is a logical high pulsed signal, the n-type transistor 617b turns on, the voltages at the gate of the n-MOS transistor 615a, the drain and gate of the n-MOS transistor 616a and the gate of the n-MOS transistor 616b become equal to the ground level.

The p-type transistor 617a turns on and the voltages at the gates of the p-MOS transistors 611a and 611b become to the voltage of the power line VDD 930.

The p-type transistor 617c turns on and the voltages at the gate of the n-MOS transistor 615b and the drain of the n-MOS transistor 616b become equal to the voltage of the power line VDD 930.

As a result, when the signal PA is a logical high pulsed signal, the differential amplifier ceases to function as an amplifier and outputs the ground level voltage to signal GA.

In the configuration described above, the voltage of the signal VREF received at the gate of the p-MOS transistor 613a is compared with the voltage of the signal MON-A received at the gate of the p-MOS transistor 613b and the voltage of the MON-A is controlled by the dividing ratio variable voltage divider 670, which receives the signal vca, so that the voltage of the signal VREF becomes higher than the voltage of the signal MON-A, thereby increasing the on-state resistance of the p-MOS transistor 613a and decreasing the on-state resistance of the p-MOS transistor 613b.

As a result, the applied to the gate of the n-MOS transistor 615a decreases and the voltage applied to the gate of the n-MOS transistor 615b increases.

Then, the on-state resistance of the n-MOS transistor 615a increases and the on-state resistance of the n-MOS transistor 615b decreases. Consequently, the voltage of the signal GA becomes lower than the voltage of the signal GA when the voltage of the signal VREF was equal to the voltage of the signal MON-A.

Accordingly, the current driving capability of the power MOS transistor MOS-PW 640 increases to exceed the current consumption capacity of the internal circuit A200 and the reduced voltage Vddma increases.

Thus, the voltage of the signal MON-A output from the dividing ratio variable voltage divider 670 increases.

However, it takes a certain amount of time to detect a voltage rise of the signal MON-A and it also takes a certain amount of time for the reduced voltage Vddma to increase. The voltage of the signal MON-A, the reduced voltage Vddma, and the voltage of the signal GA go up and down and ultimately the reduced voltage Vddma settles at a level such that the current driving capability of the power MOS transistor MOS-PW 640 counterbalances the current consumption capacity of the internal circuit A 200, that is, a voltage level such that the voltage of the signal MON-A becomes equal to the voltage of the signal VREF.

Therefore, the regulator 800 includes the pulse generator 660 that generates the signal PA that is pulsed by a rise of the voltage of the signal vca when the DVFS mode changes in the direction that increases the clock frequency, as illustrated in FIG. 4, and the differential amplifier 810 that receives the signal PA and reduces the signal GA to the ground voltage.

In the foregoing, the operation relating to generation of the signal PA by the pulse generator 660 has been described with respect to the signal vca that is an analog signal. It will be understood that if the signal vca is a digital signal, the pulse generator 660 outputs a pulse signal as the signal PA when the logical value of any of the bits of the signal vca has changed.

In summary, a semiconductor circuit device (the semiconductor circuit device 100) includes:

a power line (the VDD 930) receiving a voltage supply from an external power source;

a set of circuits (the internal circuit A 200 and the stabilizing capacitance ca 250) embedded in the semiconductor circuit device, the set of circuits having a plurality of operation modes with different operating voltages;

a power supply circuit (the regulator 800) electrically connected to the set of circuits and the power line, the power supply circuit supplying a voltage lower than or equal to the voltage of the power line to the set of the circuits; and a control circuit (the PMU 400) outputting a control signal (the signal vca) dependent on each of the plurality of operation modes of the set of circuits to the power supply circuit (regulator 800), the plurality of operation modes having different operating voltages;

wherein the power supply circuit (the regulator 800) includes:

a power supply MOS transistor (the MOS-PW 840) electrically connected to the power line (the VDD 930) and the set of circuits; and an indication circuit (the differential amplifier 810) outputting an indication signal (the signal GA) to a gate of the power supply MOS transistor, the indication signal corresponding to the control signal (the signal vca) dependent on the operation mode; and when the operation mode changes and if the operating voltage for the operation mode after the change is higher than the operating voltage for the operation mode before the change, the indication circuit (the differential amplifier 810) changes the voltage of the indication signal to the voltage equal to the ground level or the voltage of the power line, then restores the indication signal to the state that is dependent on the control signal.

The power supply circuit (the regulator 800) further includes:

a voltage divider (the dividing ratio variable voltage divider 870) electrically connected between the power supply MOS transistor and the ground line (the VSS 960) in parallel with the set of circuits, the voltage divider outputting a fractional voltage (MON-A 630), the fractional voltage being produced by reducing the voltage between the source of the power supply MOS transistor and the ground line by a factor that is dependent on the control signal (the signal vca); and a pulse generator (the pulse generator 860) generating the pulse signal dependent on the control signal by the control circuit;

wherein the indication circuit outputs the indication signal (the signal GA) to the gate electrode of the power supply MOS transistor in accordance with a result of comparison between a reference voltage (the reference voltage from the VREF generator) and the fractional voltage.

In the semiconductor circuit device, when the set of circuits (the internal circuit A) requests an operating voltage (Vddma) higher than the operating voltage in the previous operation mode because of a rise of the operating frequency after a change of the operation mode of the set of the circuits (the internal circuit A), the power supply circuit (the power MOS transistor MOS-PW 840) first supplies a voltage equal to the voltage of the power line to the set of circuits (the internal circuit A) and then supplies the operating voltage (Vddma) requested for the operation mode after the change in accordance with the control signal (the signal vca). Thus, the operation voltage (Vddma) provided from the power supply circuit (the power MOS transistor MOS-PW 840) always changes from high to low when an operation mode switching occurs, therefore the set of circuits may operate without waiting for the operating voltage to stabilize.

Therefore, in the semiconductor circuit device according to the second embodiment described above, operation may be started quickly without waiting for the operating voltage to stabilize after the operating voltage (Vddma) is changed.

There may be provided a semiconductor circuit device in which internal circuits embedded in the semiconductor circuit device may start operating quickly without waiting for an operating voltage being supplied to the internal circuits to stabilize after a change of the operation mode of the internal circuits.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A semiconductor circuit device comprising:
   a power line receiving a first voltage from an external power source;
   a set of internal circuits, each of the internal circuits having a plurality of operation modes, each of the internal circuits being provided with different operating voltages in accordance with each of the operation modes;
   a power supply circuit electrically connected with one of the set of internal circuits and the power line to provide a second voltage lower than or equal to the first voltage of the power line to the one of the set of internal circuits; and
   a control circuit controlling the power supply circuit in accordance with each of the plurality of operation modes,
   wherein when in the one of the set of internal circuits, a change of an operation mode is performed from one operation mode to another, if an operating voltage for an operation mode after the change of an operation mode is higher than an operating voltage for an operation mode before the change of an operation mode, firstly the control circuit controls the power supply circuit to supply the second voltage higher than the operating voltage for the operation mode after the change of an operation mode to the one of the set of internal circuits and secondly the control circuit controls the power supply circuit to supply the operation voltage for the operation mode after the change of an operation mode to the one of the set of internal circuits.

2. A semiconductor circuit device comprising:
   a power line receiving a first voltage from an external power source;
   a set of internal circuits, each of the internal circuits having a plurality of operation modes, each of the internal circuits being provided with different operating voltages in accordance with each of the operation modes;
   a power supply circuit electrically connected with one of the set of internal circuits and the power line to provide a second voltage lower than or equal to the first voltage of the power line to the one of the set of internal circuits; and
   a control circuit controlling the power supply circuit in accordance with each of the plurality of operation modes, wherein the power supply circuit comprises:
   a MOS transistor electrically connected with the one of the set of internal circuits and the power line;
   an instruction circuit for outputting an instruction signal to a gate of the MOS transistor, the outputting the instruction signal being controlled by the control circuit;
   a switch for connecting the gate of the MOS transistor to a ground line or the power line during a period of a pulse in a pulse signal, a timing of outputting the pulse signal being controlled by the control circuit.

3. The semiconductor circuit device according to claim 2, wherein the power supply circuit further comprises:
   a divisional voltage generator for generating a divisional voltage that is obtained by dividing a voltage between a drain of the MOS transistor and the ground line by a ratio, the ratio being provided by the control circuit;
   a pulse signal generator for generating the pulse signal, a timing of the generating the pulse signal is controlled by the control circuit, wherein the instruction circuit output the instruction signal to the MOS transistor in accordance with a result of a comparison of a reference voltage and the divisional voltage.

4. The semiconductor circuit device according to claim 3, wherein the pulse signal generator generates the pulse signal when in the one of the set of the internal circuits, a change of an operation mode is performed from one operation mode to another operation, an operational voltage for the another operation mode being higher than an operational voltage for the one operation mode.

5. The semiconductor circuit device according to claim 3, wherein the pulse signal generator generates the pulse signal having a period of the pulse width that is equal to a period of an operation mode having a maximum operational voltage.

6. The semiconductor circuit device according to claim 2, wherein if in the one of the set of internal circuits, a change of an operation mode is performed from one operation mode to another, and an operating voltage for an operation mode after the change of an operation mode is higher than an operating voltage for an operation mode before the change of an operation mode, a current provided with a capacitor connected with the one of the set of the internal circuits is larger than a current consumption of the one of the set of the internal circuits and a current provided through the MOS transistor is larger than the consumption of the one of the set of the internal circuits.

7. A semiconductor circuit device comprising:
   a power line receiving a first voltage from an external power source;
   a set of internal circuits, each of the internal circuits having a plurality of operation modes, each of the internal circuits being provided with different operating voltages in accordance with each of the operation modes;
   a power supply circuit electrically connected with one of the set of internal circuits and the power line to provide a second voltage lower than or equal to the first voltage of the power line to the one of the set of internal circuits; and
   a control circuit controlling the power supply circuit in accordance with each of the plurality of operation modes,
   wherein the power supply circuit comprises:
   a P-type MOS transistor electrically connected with the one of the set of internal circuits and the power line;
   an instruction circuit for outputting an instruction signal to a gate of the P-type MOS transistor, the outputting the instruction signal being controlled by the control circuit, wherein when in the one of the set of internal circuits, a change of an operation mode is performed from one operation mode to another, if an operating voltage for an operation mode after the change of an operation mode is higher than an operating voltage for an operation mode before the change of an operation mode, firstly the instruction circuit outputs an instruction signal having a logic level that is equal to a ground level and secondly the instruction circuit outputs an instruction signal having a voltage level in accordance with the operation voltage for the operation mode after the change of an operation mode to the one of the set of internal circuits.

8. The semiconductor circuit device according to claim 7, wherein the power supply circuit further comprises:
a divisional voltage generator for generating a divisional voltage that is obtained by dividing a voltage between a drain of the P-type MOS transistor and a ground line by a ratio, the ratio being provided by the control circuit;
a pulse signal generator for generating the pulse signal, a timing of the generating the pulse signal is controlled by the control circuit, wherein the instruction circuit output the instruction signal to the gate of the P-type MOS transistor in accordance with a result of a comparison of a reference voltage and the divisional voltage.

* * * * *